United States Patent [19]

Adler et al.

[11] Patent Number: 5,812,818
[45] Date of Patent: Sep. 22, 1998

[54] APPARATUS AND METHOD FOR TRANSLATING FACSIMILE TEXT TRANSMISSION

[75] Inventors: Richard Adler, Vero Beach, Fla.; Claude Richaud, Quebec, Canada; Troy W. Livingston, Northbrook; Wayne D. Jung, Morton Grove, both of Ill.

[73] Assignee: Transfax Inc., Vero Beach, Fla.

[21] Appl. No.: 342,418

[22] Filed: Nov. 17, 1994

[51] Int. Cl.$^6$ ................................................ G06F 13/00
[52] U.S. Cl. ..................... 395/500; 395/753; 395/752; 395/758; 395/793; 382/187; 382/188; 382/228; 382/229; 358/402; 358/407
[58] Field of Search ........................ 364/419.01, 419.02, 364/419.03, 419.04, 419.18, 724.1, 920.4; 358/261.4, 402–409, 489; 379/90, 100, 88, 94, 201, 89; 370/110.4, 111, 110.1, 123; 382/139, 183–188, 228, 229; 341/122, 155; 375/344, 376, 244, 308, 231; 395/2, 2.14, 2.33, 2.74, 275, 500, 146–148

[56] References Cited

U.S. PATENT DOCUMENTS

| | | | |
|---|---|---|---|
| 4,654,875 | 3/1987 | Srihari et al. | 382/229 |
| 4,962,452 | 10/1990 | Nogami et al. | 364/419.05 |
| 5,077,804 | 12/1991 | Richard | 382/138 |
| 5,091,876 | 2/1992 | Kumano et al. | 364/419.03 |
| 5,157,606 | 10/1992 | Nagashima | 395/752 |
| 5,175,684 | 12/1992 | Chong | 364/419.03 |
| 5,222,160 | 6/1993 | Sakai et al. | 364/419.02 |
| 5,241,674 | 8/1993 | Kuorsawa et al. | 395/803 |
| 5,268,839 | 12/1993 | Kaji | 364/419.03 |
| 5,289,375 | 2/1994 | Fukumochi et al. | 364/419.02 |
| 5,295,068 | 3/1994 | Nishino et al. | 364/419.02 |
| 5,321,607 | 6/1994 | Fukumochi et al. | 364/419.02 |
| 5,329,446 | 7/1994 | Kugimiya et al. | 364/419.04 |
| 5,343,537 | 8/1994 | Bellegarda et al. | 382/187 |
| 5,357,430 | 10/1994 | Rackow et al. | 364/419.04 |
| 5,373,441 | 12/1994 | Hirai et al. | 395/752 |
| 5,377,280 | 12/1994 | Nakayama | 382/191 |
| 5,392,212 | 2/1995 | Geist | 395/794 |
| 5,416,696 | 5/1995 | Suzuoka | 364/419.02 |
| 5,426,583 | 6/1995 | Uribe-Echebarria | 364/419.08 |
| 5,434,777 | 7/1995 | Luciw | 364/419.13 |
| 5,442,546 | 8/1995 | Kaji et al. | 364/419.08 |
| 5,461,488 | 10/1995 | Witek | 358/402 |
| 5,465,309 | 11/1995 | Johnson | 395/795 |
| 5,491,758 | 2/1996 | Bellegarda et al. | 382/187 |
| 5,535,120 | 7/1996 | Chong et al. | 395/794 |

*Primary Examiner*—Jacques H. Louis-Jacques
*Attorney, Agent, or Firm*—Fitch, Even, Tabin & Flannery

[57] ABSTRACT

A translating facsimile machine includes a facsimile input receiver which feeds a facsimile input signal representative of a source language text to an optical character recognizer. The optical character recognizer converts the facsimile signal to a source natural language text signal which is then tested in a source language recognizer and, if recognized, is then processed by a translator which converts the source natural language signal to a target natural language signal. An output device such as a printer receives the target natural language signal and outputs it to a roll of paper or the like.

15 Claims, 18 Drawing Sheets

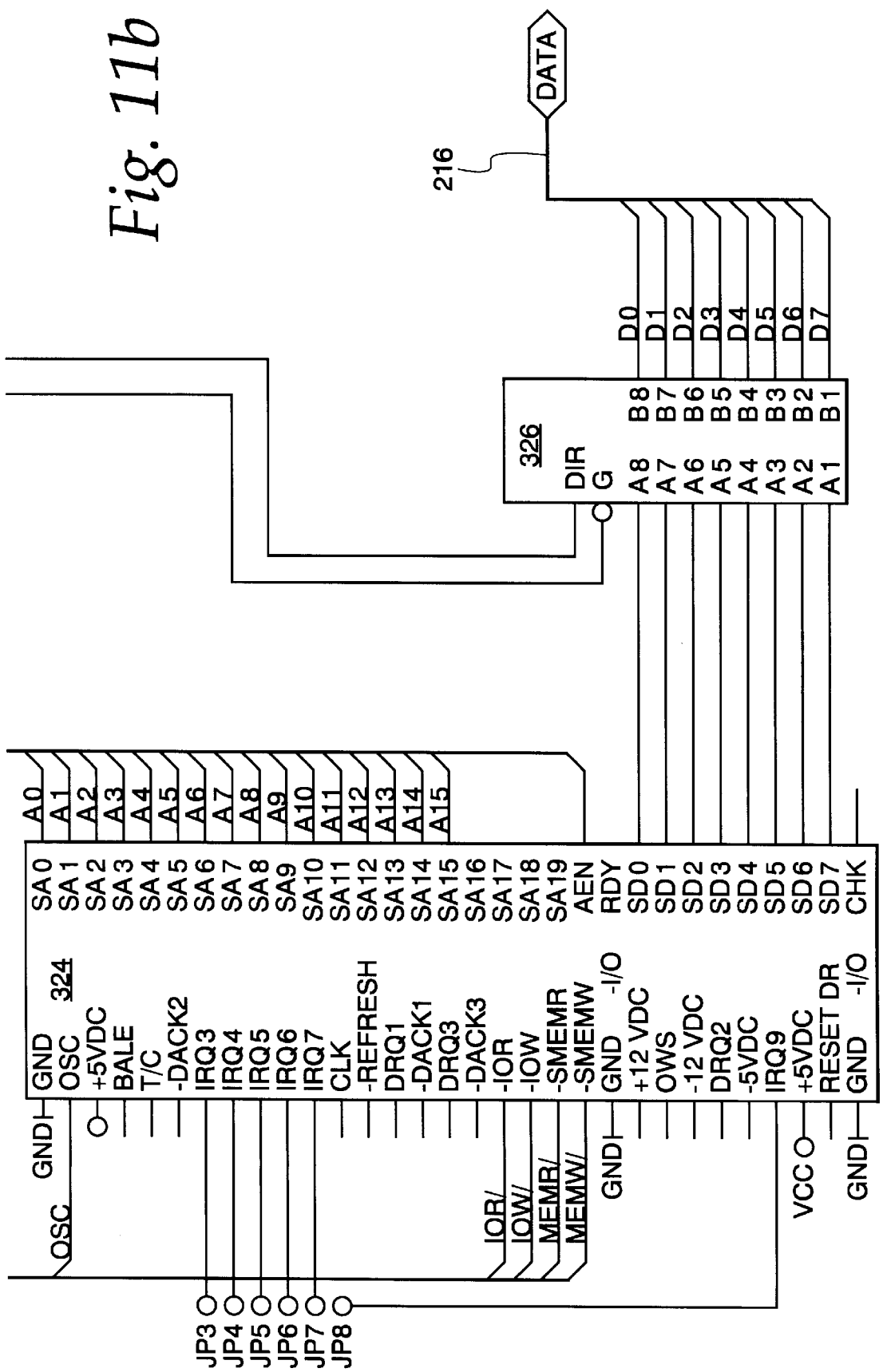

| Fig. 12a |
|----------|
| Fig. 12b |

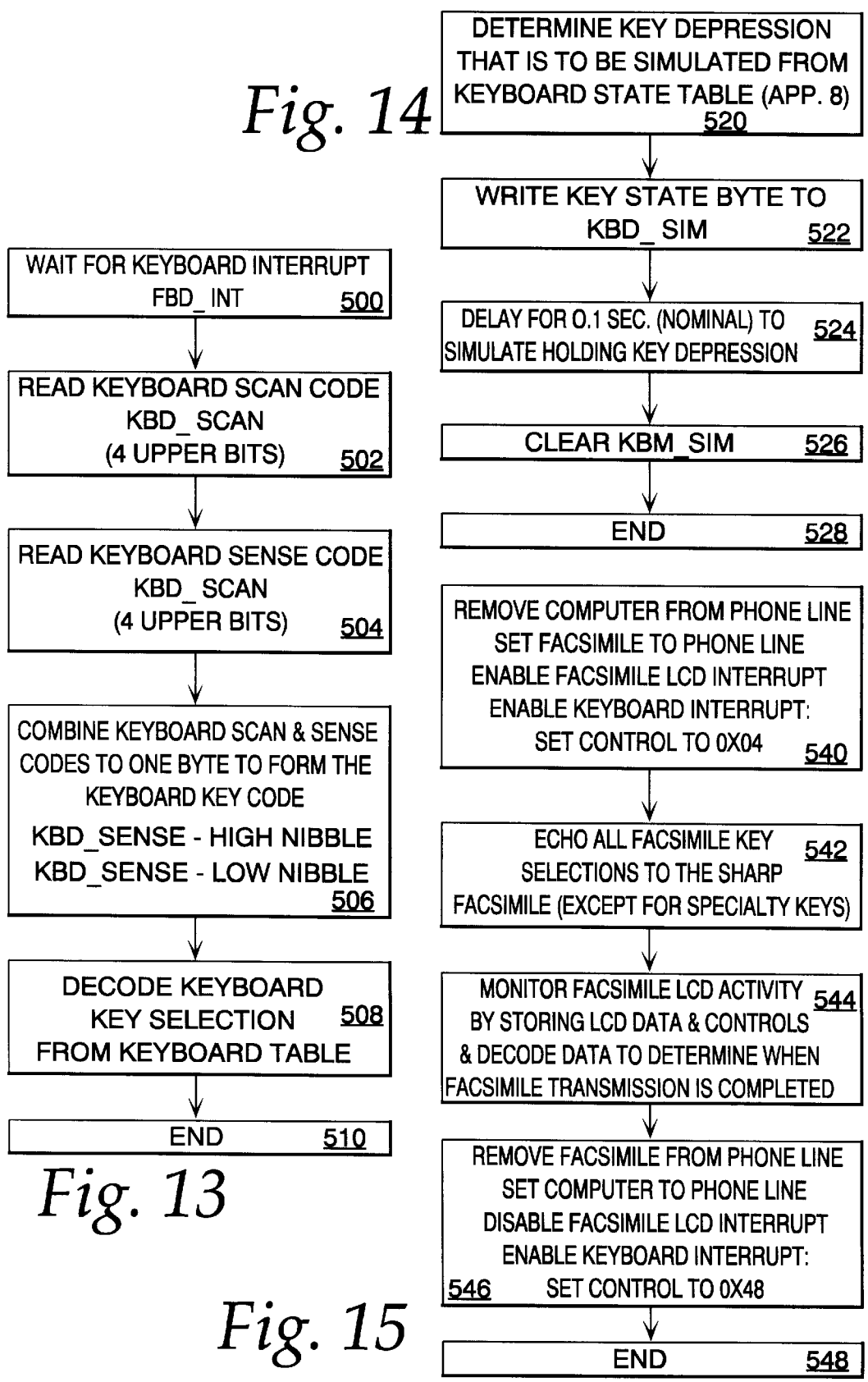

APPARATUS AND METHOD FOR TRANSLATING FACSIMILE TEXT TRANSMISSION

BACKGROUND OF THE INVENTION

The invention generally relates to a facsimile translation machine that transmits or receives text images in a source natural language such as French or English. More particularly the invention relates to a facsimile machine that can recognize a source natural language within the text of a facsimile signal and translate the same source natural language to a desired target natural language and provide an output thereof.

The continuing popularity of facsimile machines as communication tools in the business community is evident from their worldwide availability and use. The industry standardization of a facsimile transmission protocol has permitted their global manufacture and use. However, despite the ability of a facsimile machine made and used overseas to communicate with an American-made machine, if the message sender and the message recipient are only able to express themselves in different natural languages, the facsimile machine alone cannot completely facilitate communication between them. As companies expand their international business activities the need to be able to traverse language barriers is clear.

A text translation machine that can be interfaced with a facsimile machine is described in U.S. Pat. No. 5,175,684 to Chong. Chong teaches translating a source natural language to a target natural language. However, Chong is incapable of recognizing the source language from the source natural language itself. A facsimile signal representative of a manually prepared, special cover sheet with predefined locations for providing specialized indicia designating the source language must precede facsimile transmission of the source natural language text to be translated. The Chong machine requires human intervention to prepare a special manual control signal to configure the machine for each transmission containing a different natural source language.

Not being able to recognize the source natural language of a facsimile transmission significantly limits the desirability of Chong. To use the translation capability of a remote machine of the type taught by Chong requires a sender using a standard facsimile machine to be aware of the capability, to have a copy of the special cover page, and to understand exactly how to identify the source natural language of her message. Given that the message sender and the message recipient in this situation need a translator to communicate, it may be difficult for the receiver to convey this information to the sender. Thus, Chong's requirement of a special manually prepared control signal to precede facsimile transmissions effectively creates a non-standard extension to the standard facsimile transmission protocol.

What is needed is a language recognition and translation facsimile machine that can automatically recognize the source language directly from the text images being received without having to resort to a non-standard prologue to identify the source natural language.

SUMMARY OF THE INVENTION

Apparatus for translating a facsimile signal representative of text in source natural language into a target natural language text signal has a facsimile input receiver, an optical character recognizer for converting the facsimile signal to a source natural language text signal, a source language recognizer, a translator for converting the source natural language to a target natural language signal, natural language recognition and a portion on another input device for producing a visually perceivable target natural language output.

The apparatus can signal a remote facsimile machine from which it is to receive a transmission to send facsimile signals representative of the source natural language text in a high resolution mode to aid in providing more accurate translations.

The facsimile input includes a facsimile machine or fax-modem for receiving an inbound facsimile signal representative of text images in a source natural language or a page scanner for scanning in hard copy images of text. The optical character recognizer includes an optical character recognition and conversion software module executable in a microprocessor for converting the input signal representative of a text image in a source natural language from the facsimile machine, fax-modem or page scanner into an ASCII text source natural language signal representative of the source natural language text. The natural language recognizer is executed by the microprocessor. The natural language recognizer acts upon the ASCII text source natural language signal in combination with data from a database of one or more natural languages. An etymologizer software module while being executed by the microprocessor causes the microprocessor to perform lookups for text matches in the first database to determine the source natural language of the ASCII text directly and exclusively from the ASCII text source natural language signal itself without the need for separately coded entries indicative of the source natural language.

The natural language translator includes the microprocessor that executes a software for translating the OCR output of the source natural language text image to a target natural language translation text. The natural language translator also has a first dictionary database for relating words of the source natural language to words of the target natural language. A lexicography software module is executed by the microprocessor to generate a second database containing undefined source natural language words by finding source natural language words present in the ASCII source natural language text signal but not contained in the first database.

The logical analysis and grammar correlation module creates an image of the sentence by analyzing interdependencies and establishing links between miscellaneous component words: subject, verb, object, subordinate clause, etc. Logical structures are then correlated against grammar constructs until a "legal" structure is arrived at, and then passed on to the target language generation program.

The logic and syntactic parser module has a dual goal—first, to build a model of the linguistic structure of the sentence and, second, in so doing, to eliminate syntactic ambiguities, i.e., to assign a syntactically accurate category to words with several possibilities. To carry out this analysis, the system uses recursive structural trees which are gradually built as the words are being parsed. Therefore, no structure is predetermined, illegal, or limited. The only common feature is recursivity, in that the internal structure of a phrase includes the anchorage point of a large number of similar or dissimilar phrases, all with an identical anchorage point. Thus, the network can continue to ramify as long as the words keep coming, and as long as they are logically interrelated. While building up the structure, the system uses three constituent levels: individual words which can be used separately, such as adverbs for example; clusters of words which make up a functional group in the sentence, such as noun-groups or verb-groups, with such functions as object, subject, etc.; and clauses which are made up of word clusters or individual words and which can themselves be related to other clauses. A sentence is a group of clauses. The tree-like structures are custom-built to reproduce the logical structure of the sentence in the source language, and to the inference engine used to build them. In particular, the inference engine is generalized to allow analysis of structures in various known languages, and to reject all incomplete or incorrect sentences which do not result in a logical structure. The inference engine uses a mathematical representation of language, is fully recursive and re-entrant, and self-determines and modifies its own strategy depending on the current structure, and incoming components in the sentence to be translated. It systematically applies the concepts of artificial intelligence to the field of linguistics to allow complete and systematic analysis of natural language.

The inventive apparatus also includes software for execution by the microprocessor that checks the accuracy of a translation.

From time to time a definition retrieval software module is executed by the microprocessor causing the microprocessor to send the second database of undefined source natural language words in the form of a facsimile encoded signal to a remote site for human and/or machine translation. In response to an outside request, it also can receive a facsimile transmission representative of entries for a third database relating the previously undefined source natural words of the second database to words of the target natural language. A merge software module is executed by the microprocessor to update the first database with the contents of the third database.

The output system comprises the computer data and control interface and software for converting text in the target natural language to an output signal for a facsimile machine, a modem or a printer. The facsimile machine, the printer or the modem generate the target natural language output of the text as respectively a facsimile signal or a modem signal or as printed hard copy.

It is a principal aspect of the present invention to provide apparatus for natural language recognition and translation that identifies the source language directly from the source natural text alone and provides a translation of the text.

It is a further aspect of the invention to provide apparatus that activates and configures its own translation capability based solely on the text of the transmitted or received message.

Other aspects of the present invention will become apparent to one of ordinary skill in the art upon review of the specification and claims in light of the accompanying drawings.

BRIEF DESCRIPTION OF THE DRAWINGS

FIGS. 11a–b are a schematic diagram of an ISA bus decoder of the translating facsimile machine shown in FIG. 1;

FIG. 13 is a flow chart showing details of a keyboard handling software;

FIG. 14 is a flow chart showing additional details of the keyboard handling software;

FIG. 15 is a flow chart related to the operation of the translating facsimile machine shown in FIG. 1;

DETAILED DESCRIPTION OF THE PREFERRED EMBODIMENTS

Figure 1:
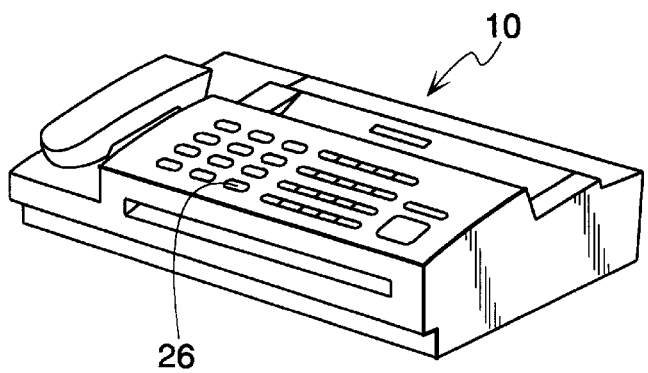
FIG. 1 is a perspective view of a translating facsimile machine embodying the present invention.
Figure 2:
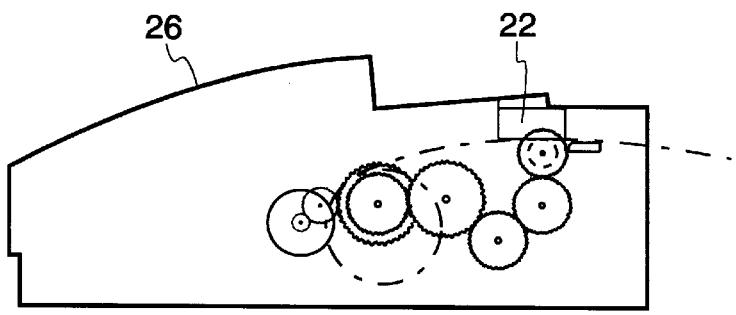
FIG. 2 is a schematic side elevational view of the translating facsimile transmission machine shown in FIG. 1 showing details of a paper handling train therein.
Figure 3:
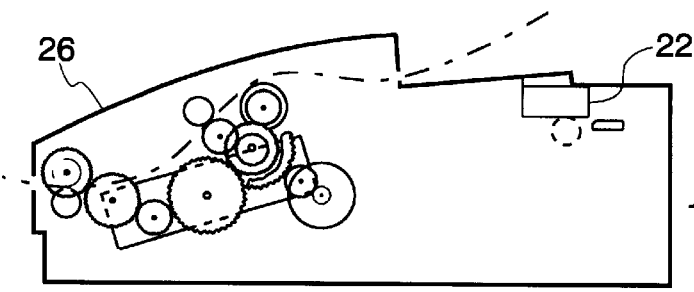
FIG. 3 is a schematic view of the translating facsimile machine shown in FIG. 1, showing details of an input paper handling path therein.
Figure 4:
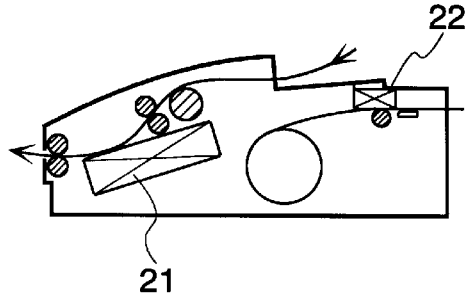
FIG. 4 is a schematic side view of the translating facsimile machine shown in FIG. 1, showing details of the paper paths together with a scanner head and a thermal printer.
Figure 5:
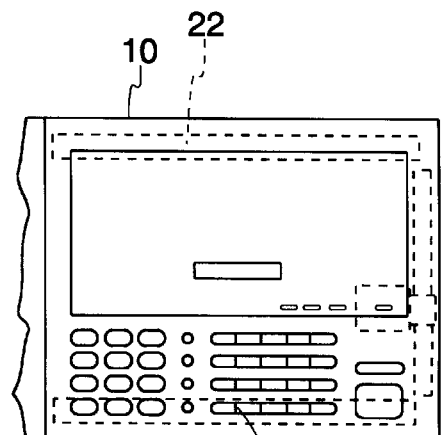
FIG. 5 is a elevational view of a portion of the translating facsimile machine shown in FIG. 1 showing the location, in dotted form, of the thermal printer and the paper drive gear trains.
Figure 6:
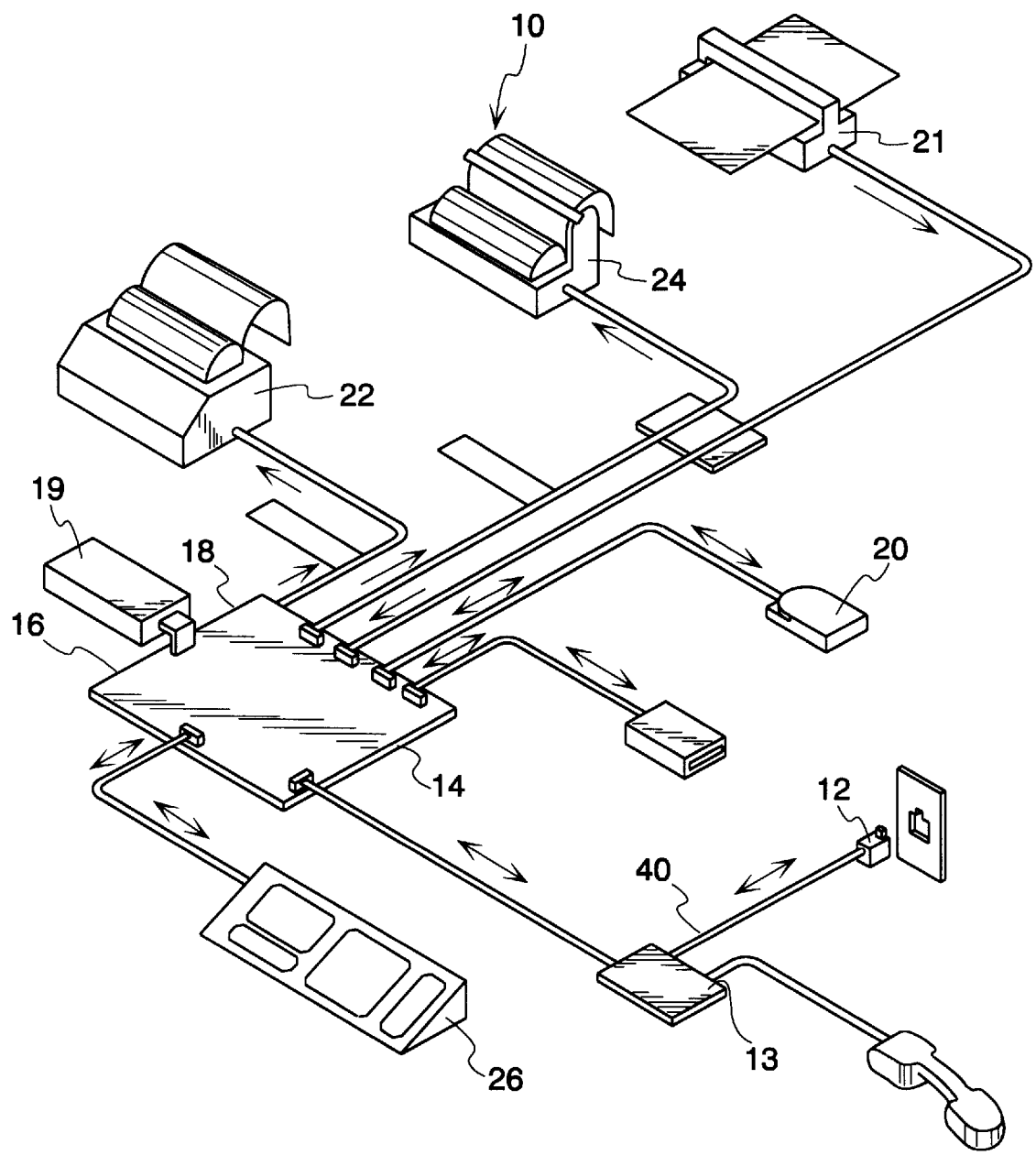
FIG. 6 is a partially schematic view of the electrical organization of the translating facsimile machine shown in FIG. 1.

Referring now to the drawings, and especially to FIGS. 1 and 6, apparatus for translating a facsimile signal representative of a source natural language to a target natural language, specifically a translating facsimile machine, is generally identified by numeral 10. The translating facsimile machine 10 includes a facsimile input receiver or jack 12, coupled to receive a facsimile signal and to send the facsimile input signal to an optical character recognizer 14 for converting the facsimile signal to a source natural language text signal. A source natural language recognizer 16 also receives the optical character recognition signal and determines whether the signal is representative of text in a recognizable source natural language. If the text of source natural language is recognized, a source natural language translator 18 converts the source natural language text signal to a target natural language text signal which may be stored in a storage unit or which may be output in visually perceptible form through an output device such as a printer 22. Alternatively, an additional output device 24 may be connected to the facsimile machine. Control of the facsimile machine is effected through a front panel 26.

Figure 7:
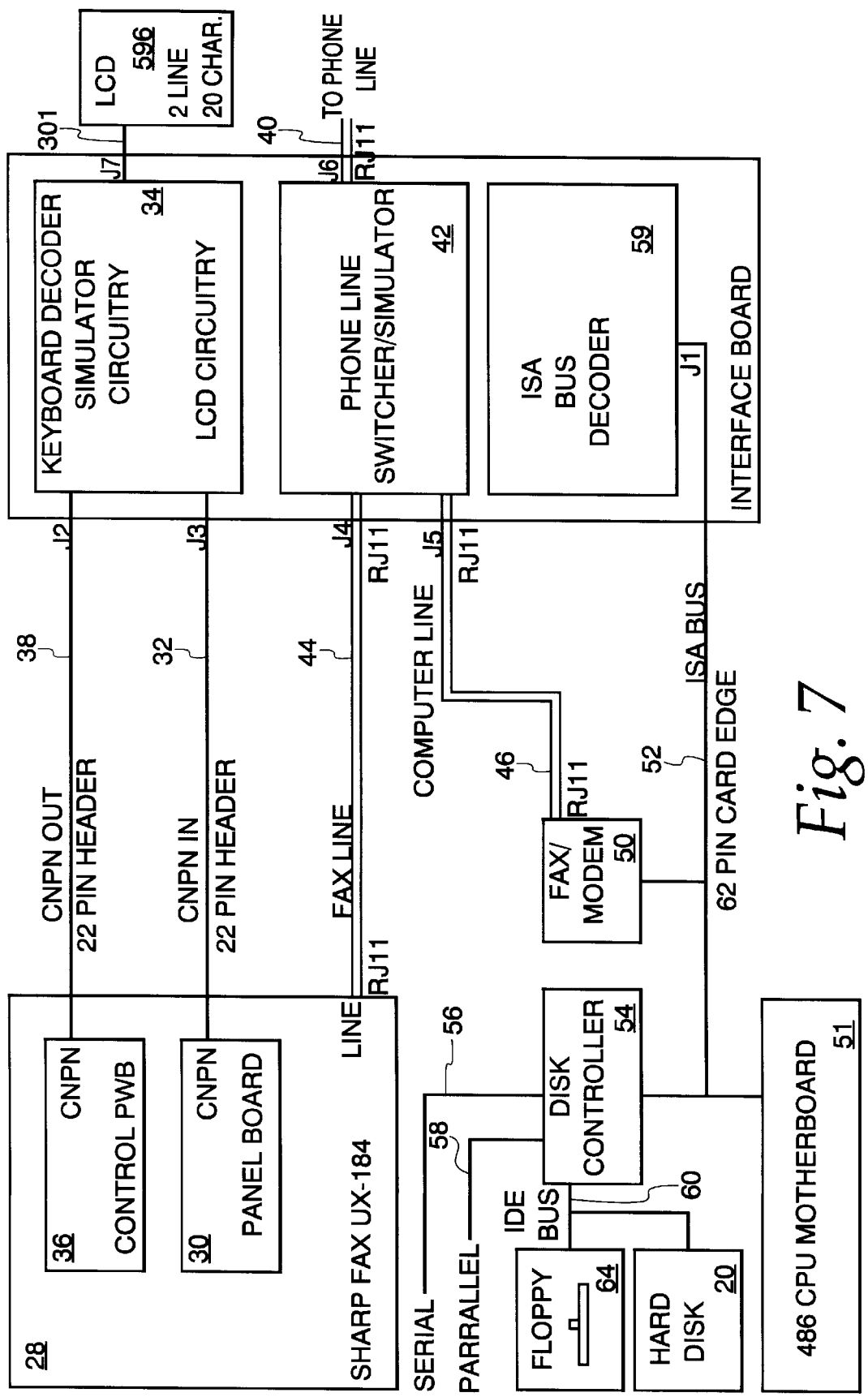
FIG. 7 is a block diagram of electrical portions of the translating facsimile machine shown in FIG. 1.

As shown in FIG. 7, the apparatus 10 includes a Sharp Model UX184 facsimile machine, identified generally by numeral 28, having a panel board 30 that is electrically coupled through a panel board bus 32 to a keyboard decoder/simulator circuit 34. The keyboard decoder/simulator circuit 34 also is connected to a control circuit 36 in order to control various facsimile functions via a control bus 38.

The facsimile signals representative of the text of a source natural language are received by the jack 12 which supplies facsimile signal to a facsimile bus 40 connected to a phone line switcher simulator 42 connected via an internal facsimile bus 44 and a computer bus 46 to other portions of the system. The internal facsimile bus 44 is connected to the facsimile machine 28. A computer bus 46 is connected to a Zoom Telephonics 200M VFP fax-modem card 50. The fax-modem card 50 can communicate at 14,400 bps in conformance with the V.32 bis standard and runs under V. 42 bis/MNP for PC compatible systems. It is connected to a motherboard 51 via an ISA bus 52. The motherboard 51 is a Model PX-486 (SOJ Version) Half Size VL Bus board available from Micronics, Inc. of 232 E. Warren, Fremont, Calif. The motherboard 51 includes an Intel 486SX microprocessor, random access memory and read only memory. The motherboard 51 and ISA bus 52 comprises a portion of a computer 53. The ISA bus 52 is also connected to a disk controller unit 54 of the computer 53 having a serial port 56 and a parallel port 58. An IDE bus port 60 connects the disk controller unit 54 to a hard disk drive 62 and to a floppy disk drive 64. An ISA bus decoder 59 is connected to the ISA bus 52.

When a facsimile signal is received through the phone line 40, it is fed through the phone line switcher simulator 42 to the fax-modem card 50 which outputs a signal to the ISA bus 52.

Figure 8:
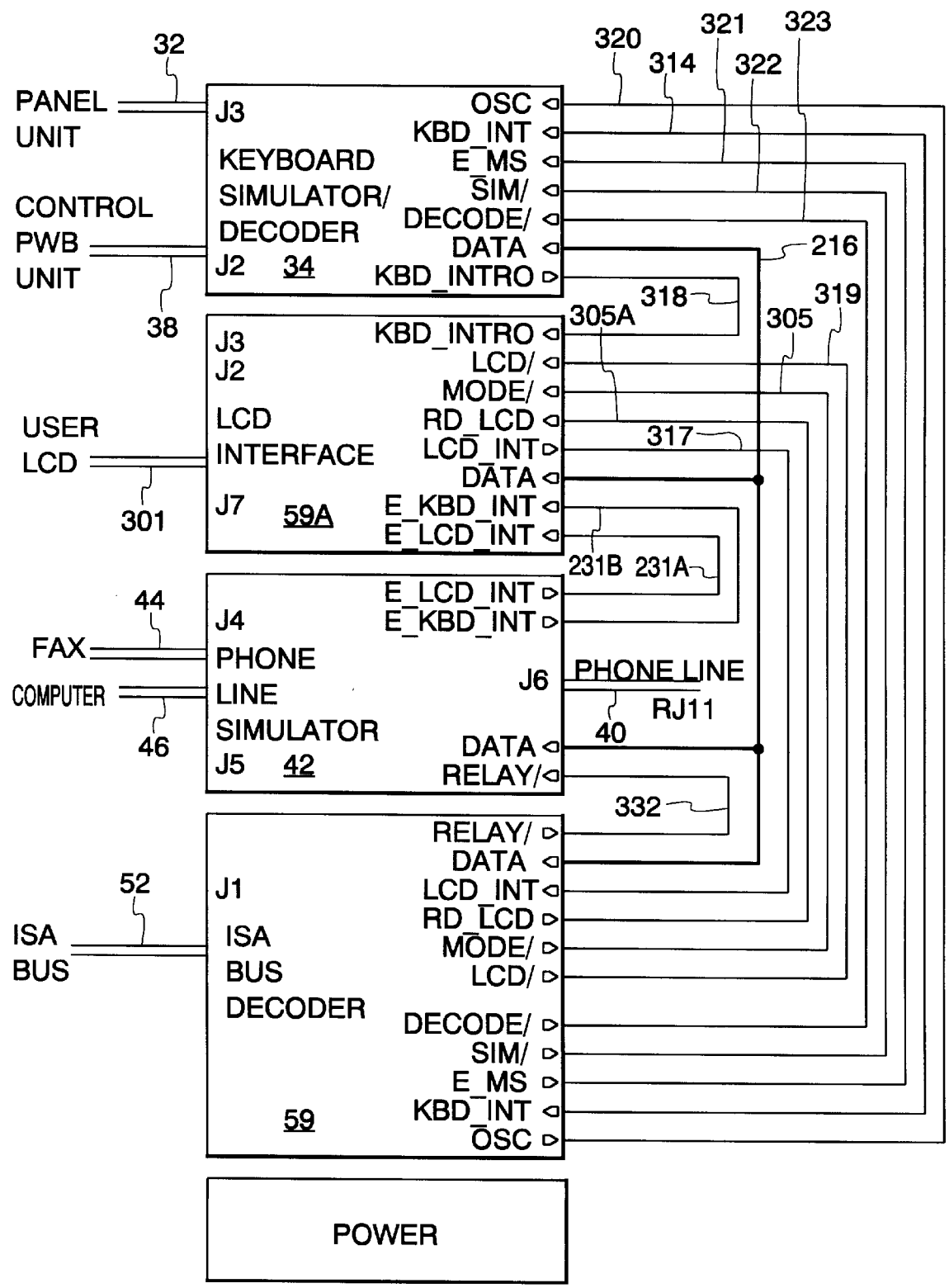
FIG. 8 is a block diagram of an interface board portion of the electrical circuitry of the translating facsimile machine shown in FIG. 1.
Figure 9:
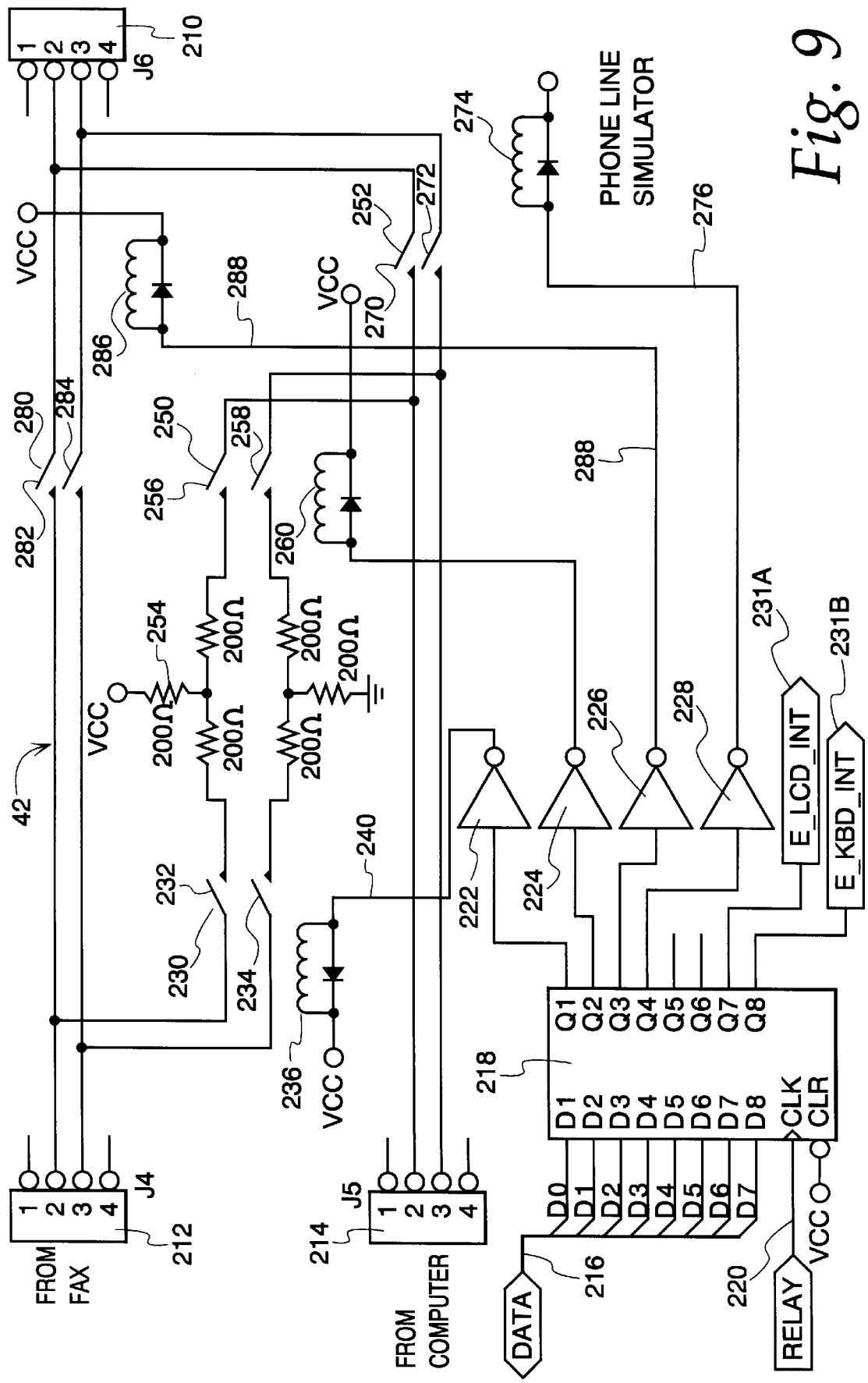
FIG. 9 is a schematic diagram of a phone line simulator circuit for the translating facsimile machine shown in FIG. 1.

Referring now to FIGS. 8 and 9, the phone line 40 is coupled through a J6 jack 210 which is a portion of the phone simulator 42. Signals may be exchanged from the phone line 40 coupled to the J6 jack 210 to a J4 jack 212 coupled to the facsimile line 44. The phone line simulator 42 may, in the alternative, steer signals between the J6 jack 210 and a J5 jack 214 which is connected to the two-line computer bus 46. The phone simulator 42 is coupled via an internal interface board data bus 216 to the ISA bus decoder 59 and to the keyboard simulator 34. Eight bits of data on the bus 216 are fed to a 74LS273 octal D flip-flop or latch 218 which is clocked by a signal on a relay line 220 extending from the ISA bus decoder 59 to the phone simulator 42. The data bits corresponding to bits D0 through D3, respectively, are output from Q outputs of the latch 218 to 74LS06 inverters 222, 224, 226 and 228 to control a plurality of relays. The Q7 output drives an E_LCD_INT line 231 a. The Q8 output drives an E_KBD_INT line. The inverter 224 controls a double pole relay 230 having a pair of relay switches 232 and 234 and a relay solenoid 236. The signal from inverter 222 is fed over a line 240 to the solenoid 236. It should be appreciated that when inverter 222 switches low, current is allowed to flow through the coil 236 to the inverter energizing the coil and closing switches 232 and 234 which then allow a signal to be fed either to the computer bus 214 from the facsimile machine or from the computer back to the facsimile machine or from the computer 214 to the jack 210 connected to the phone line 40.

Ultimate steering of the signals is controlled by the state of a relay 250 and a relay 252. The relay 250 is connected to a resistor network 254 via a pair of switches 256 and 258 controlled by a solenoid 260 coupled between a source of voltage an a control line 262. The potential on the control line 262 is controlled by the state of the inverter 224. The relay 252 includes switches 270 and 272 as well as a solenoid 274 connected via a line 276 to the inverter 228 to be controlled therefrom. Finally, a relay 280 comprising a pair of switches 282 and 284 and a solenoid 286 has the solenoid connected to a line 288 which is connected to the inverter 226. Thus, when the data bit from data line D2 is high and data bits D0, D1 and D3 are low, the relay 280 is closed connecting the facsimile bus 44 through the jack 212 to the phone line 40 via the jack 210. All of the other relays are left open. If it is desired to uncouple the facsimile bus directly from the phone line and to couple the computer to the phone line, the data bit D3 goes high, all other data bits are held low causing relay 270 to close while all other relays are allowed to be open, thereby connecting the J6 jack 210 directly to the J5 jack 214 which is coupled to the computer bus 46. If it is desired to output signals from the computer through the facsimile machine, the two highest order bits D2 and D3 are set low, lower to bits D1 and D0 are set high causing the relays 270 and 280 to be open and the relays 230 and 250 to be closed, coupling the computer to the facsimile lines through the voltage biasing network 254.

Figure 10A:
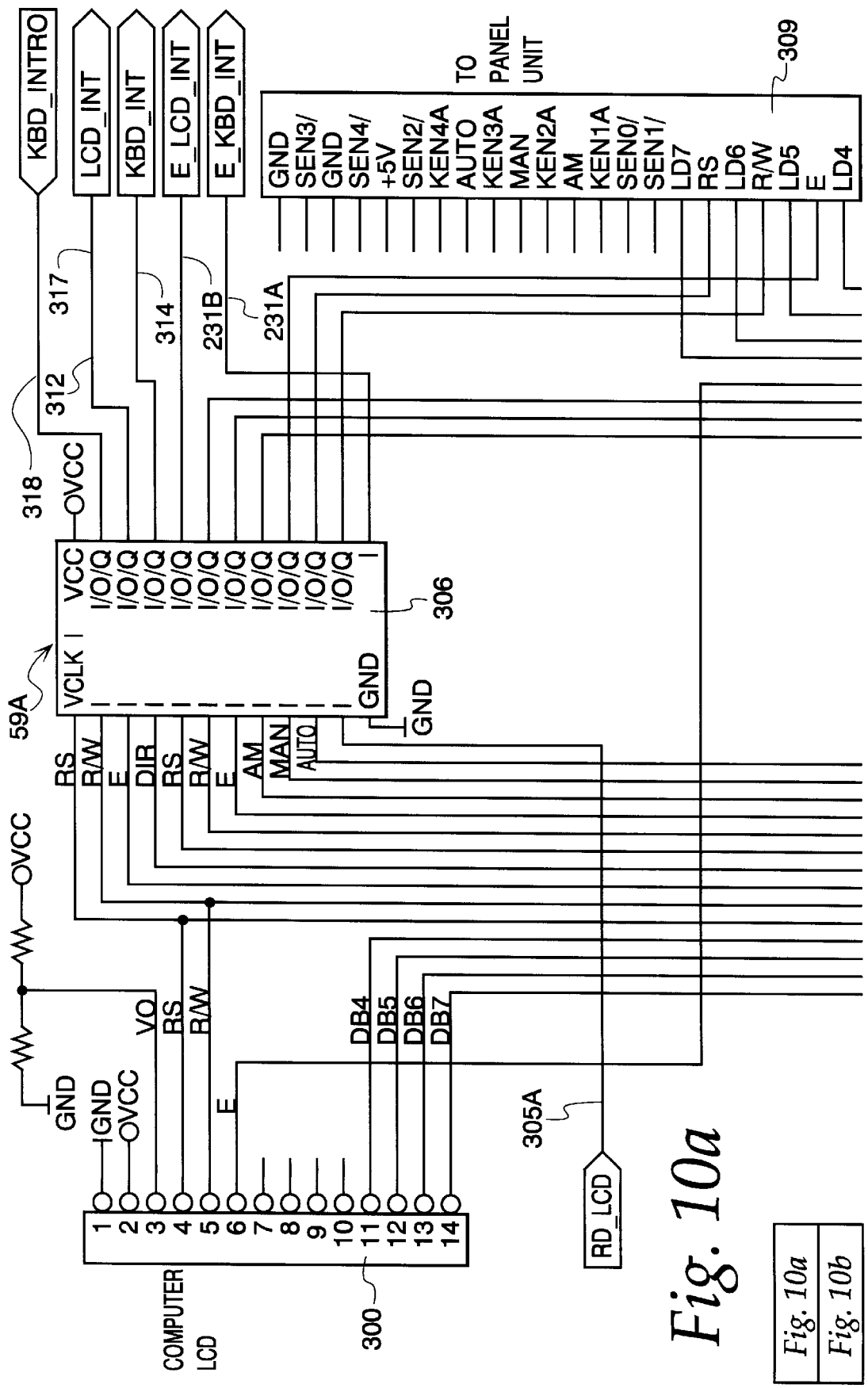
FIGS. 10a–b are a schematic diagram of a liquid crystal display interface circuit of the translating facsimile machine shown in FIG. 1.
Figure 10B:
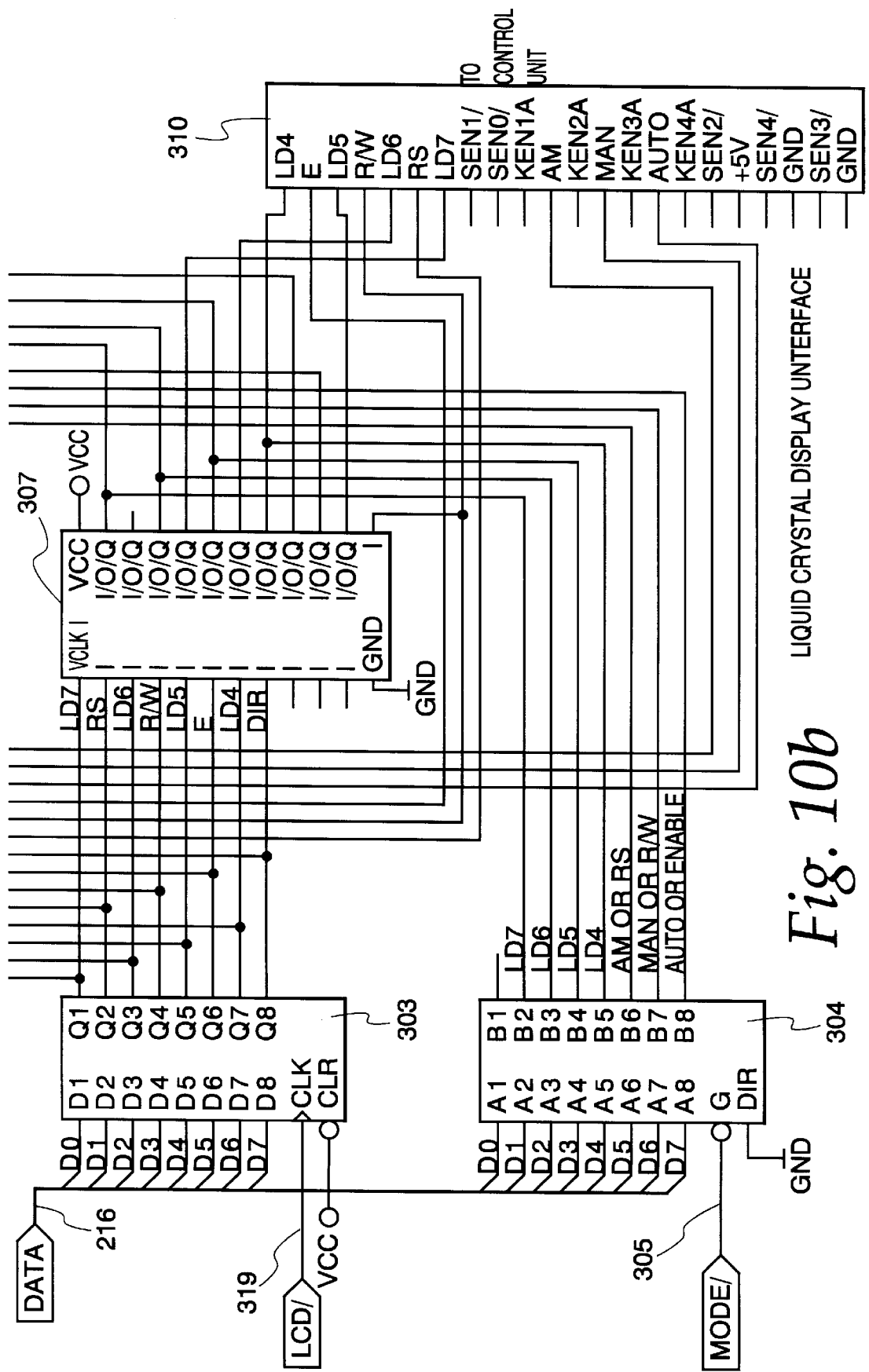

The liquid crystal display interface as is shown in detail in FIGS. 10a–b is coupled via a J7 jack 300 to a bus 301 connected to a liquid crystal display positioned on the front panel of the facsimile machine housing. Driver output signals are supplied through jack J7 and bus 301. The bus 301 drives a display 59. Data is received on the data bus 216 which is connected to a 74LS273 octal-D flip-flop or latch 303 and to a 74LS245 octal bus transceiver 304 controlled via a mode line 305 connected to its G pin. The transceiver receives outputs both from a 22V10 generic array logic device 306 (U6) and a 22V10 generic array logic device 307 (U9). Generic array logic devices 306 and 307 are programmed as set forth in the appendix for the respective portions indicated by numbers U6 and U9. Both generic array logic devices 306 and 307 receive inputs from the latch 303 tapped from the bus 216. It may be appreciate that data from the data bus 216 is also delivered to the J7 jack 300 for driving the LCD display. Interconnection is effected with the panel board or panel unit 30 via a J3A connector 309 and to the control board 36 via a J2A connector 310 to allow communication to travel back and forth between the liquid crystal display interface and the facsimile machine 28. In addition, the generic array logic device 306 drives an LCD_INT line 312, a KBD_INT line 314 as well as E_LCD_INT line 231a and E_KBD_INT line 231b.

An LCD_INT line 317 is coupled between the LCD interface 59a and the ISA bus decoder. A KBD_INTRQ line 318 is connected between the keyboard simulator/decoder 34 and the LCD interface 59a. An LCD/line 319 is coupled between the LCD interface 59a and the ISA bus decoder 59.

Translation of facsimile standard signals to ISA bus standard signals is achieved through the action of the keyboard simulator/decoder 34 and the ISA bus decoder 59.

Figure 11A:
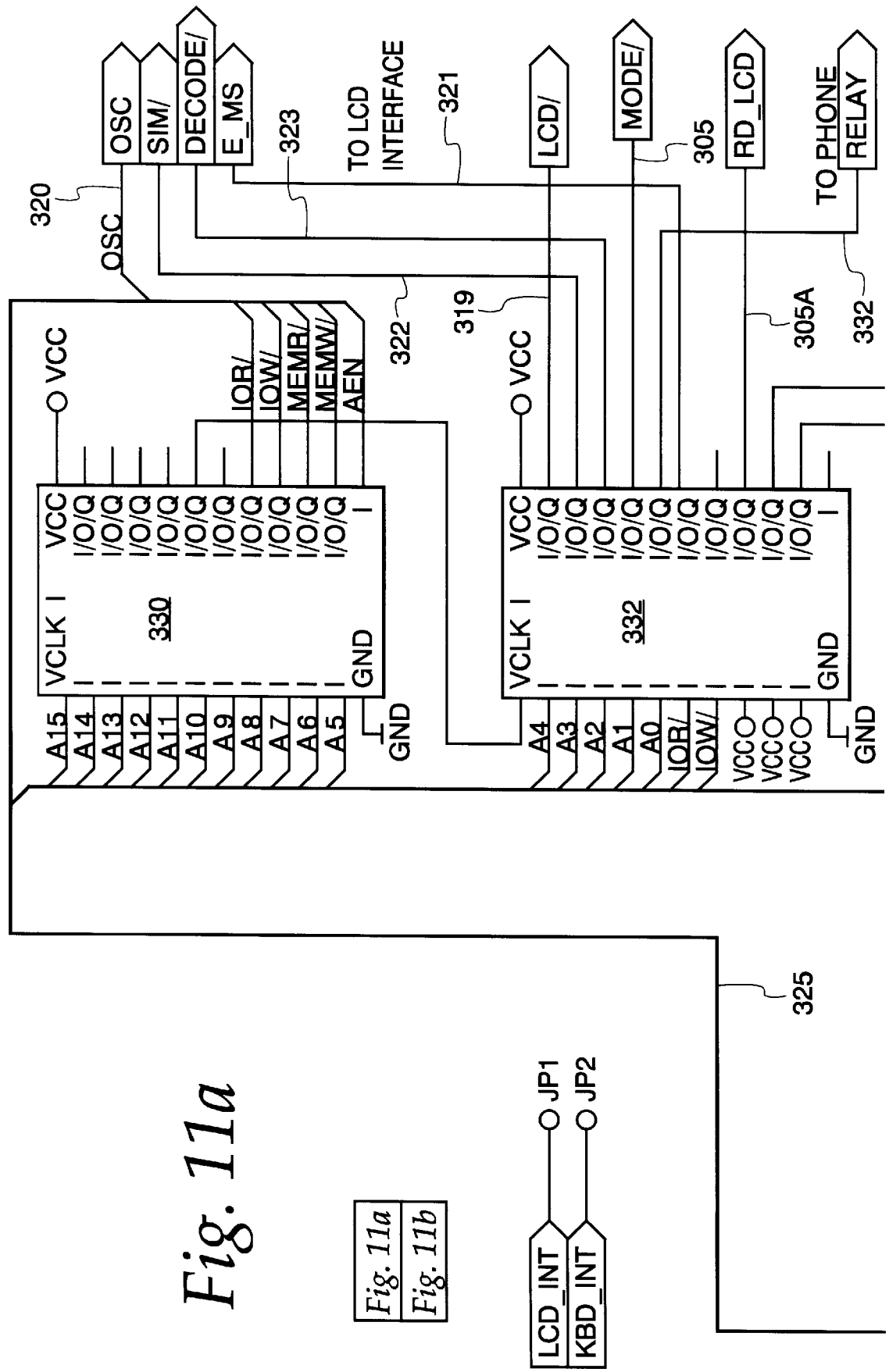

As is shown in FIGS. 8 and 11a–b, the keyboard simulator/decoder communicates over an oscillator line 320, an E_MS line 321, a SIM/line 322, a decode line 323, the KBD_INT line 314, the KBD_INTRQ line 318 and the data bus 216 with the ISA bus decoder 59, the LCD interface 59a and the phone line simulator 42.

Referring now in particular to FIGS. 11a–b, a J1 jack 324 having standard ISA bus pins is coupled via an internal decoder bus 325 to a GAL 22V12 generic array device 330 (U1) and a 74LS245 octal bus transceiver 326. The data bus 216 is coupled bidirectionally through the transceiver 326 via a plurality of lines 327 to the J1 jack 324. The generic array logic device 330 (U1) and 332 (U2) are internally programmed as set forth in the attached appendix. The generic array logic devices convert signals from the ISA bus standard to internal or facsimile media standard signals and vice versa. The ISA bus decoder 59 thus allows personal computer compatible signals of the ISA bus type to be converted to facsimile compatible signals of the type carried inside the facsimile machine as fed to and from the keyboard simulator/decoder 34.

Figure 12A:
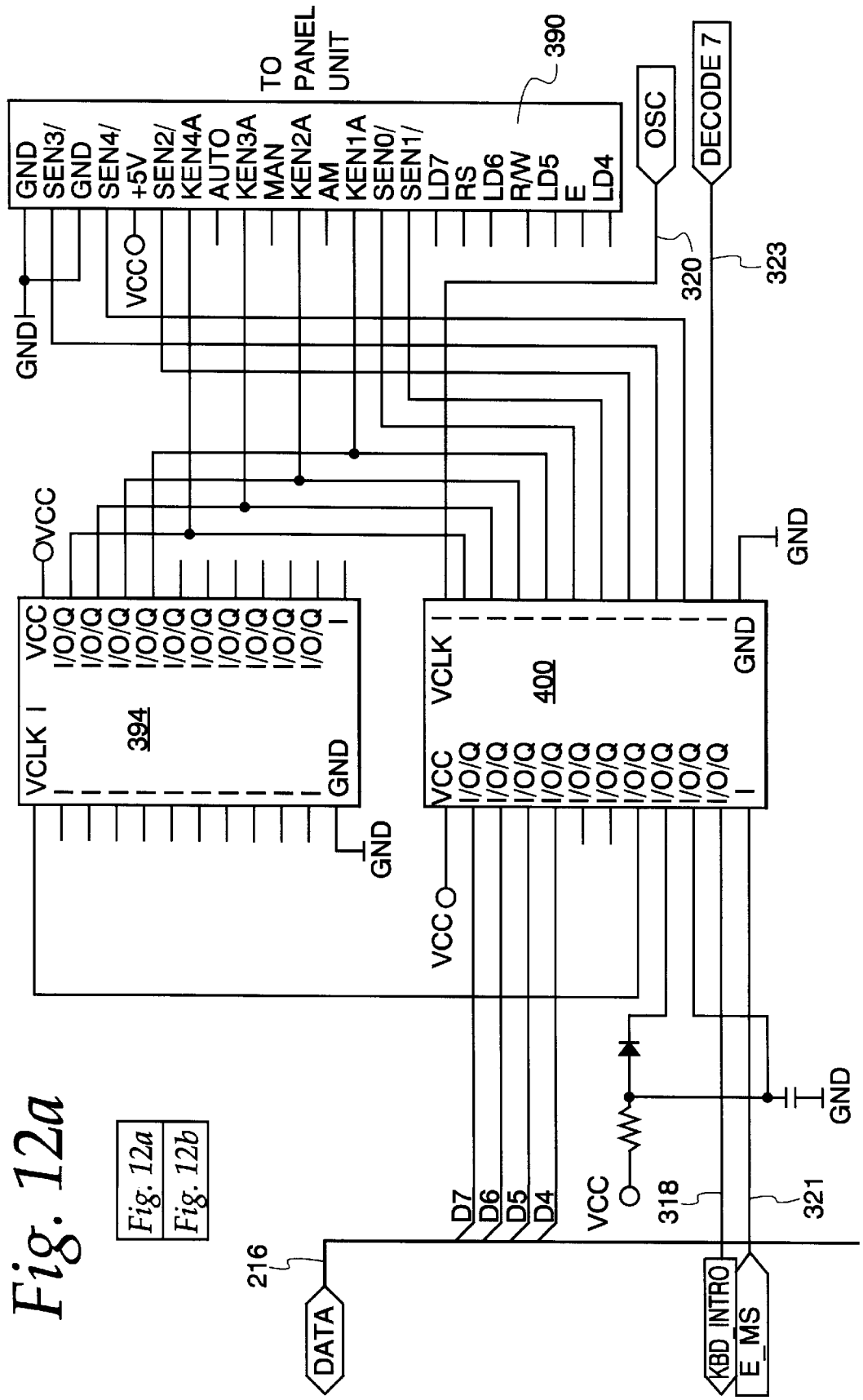
FIGS. 12a–b are a schematic diagram of a keyboard simulator/decoder circuit of the translating facsimile machine shown in FIG. 1.
Figure 12B:
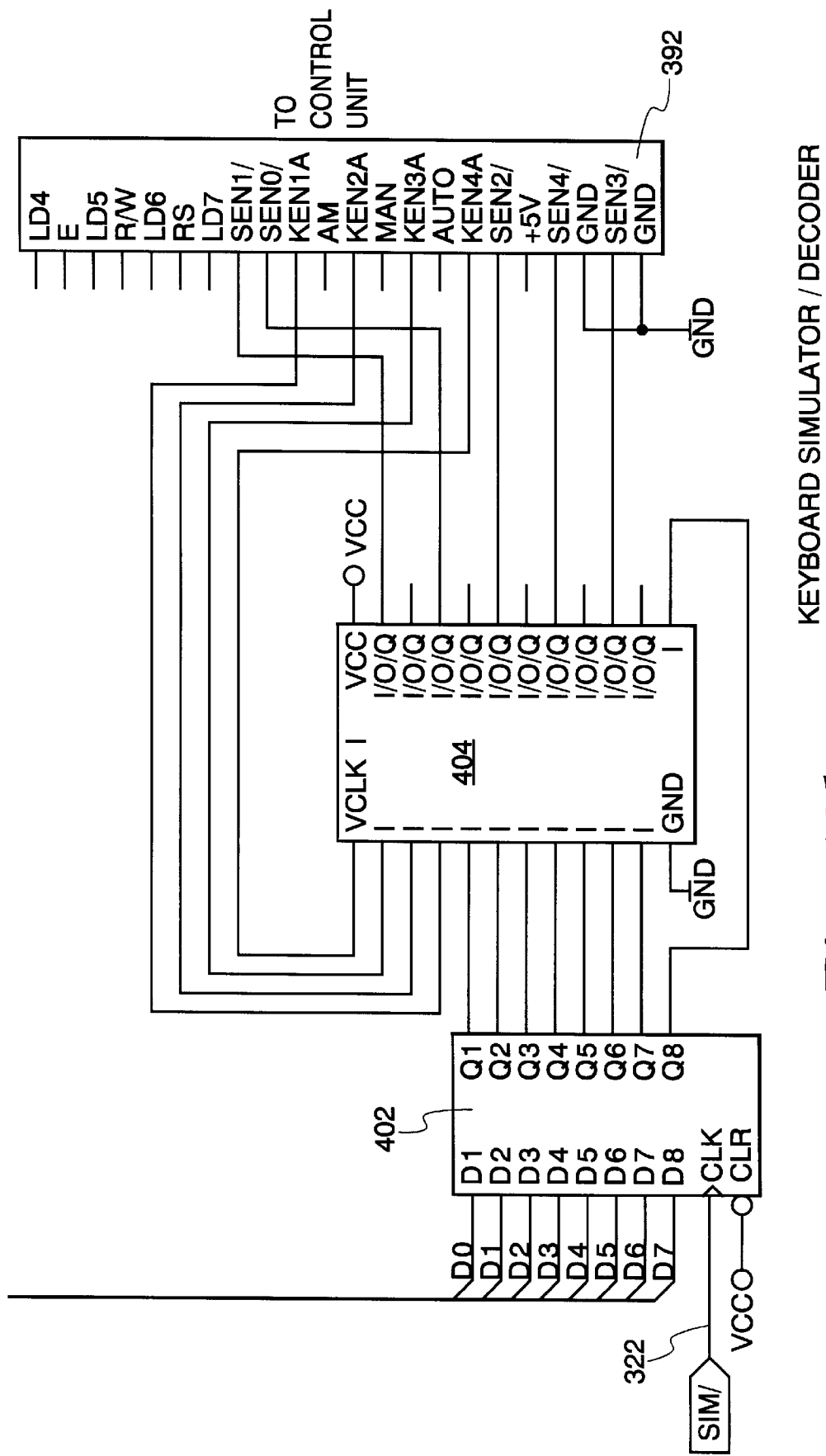

The keyboard simulator/decoder 34 is shown in greater detail in FIGS. 12a–b. The bus 32 is connected to a J3 jack 390 and the control PWB unit bus 38 is connected to a J2 jack 392. The signals represented at jacks 390 and 392 are standard signals for the Sharp UX184 facsimile machine. A portion of the signals from the J2 jack are fed to the control unit in the facsimile machine via a GAL 22V10 generic array logic device 394 (U10), the encoding for which is set forth in the attached appendix.

The data bus 216 is in communication with a 22V10 generic array logic device 400 (U11) and a 74LS273 octal-D flip-flop or latch 402. The Q1 through Q11 outputs from latch 402 are fed to a 22V10 generic array logic device 404 (U6) which is programmed as set forth in the appendix and which is, in turn, connected the J2 jack 392 extending to the panel unit bus 32. Data lines D4 through D7 are also coupled to the generic logic device 400 which drives a portion of the J3 pins 390 connected to the panel unit bus 32.

Referring now to FIG. 13, a keyboard interrupt routine which is executed by the microprocessor 76 and is normally stored on the hard drive 62 is shown therein. The keyboard interrupt routine is stored in RAM 70 and in an step 500 awaits a keyboard interrupt signal. Upon receiving the keyboard interrupt signal, it reads a keyboard scan code in a step 502 and a keyboard sense code in a step 504. In a step 506, the keyboard scan and sense codes are combined in a single byte to form a keyboard key code which is decoded in a step 508. The routine keyboard interrupt is completed in a step 510. Key selection is determined in a key selection routine shown in FIG. 14. The key selection routine is initiated in a step 520 that determines the proper key depression from a keyboard state table. A key state byte is written in the step 522. In a step 524 a tenth of a second delay simulates a holding key depression and in a step 526 a KEYBM-SIM variable is cleared. The routine is exited in a step 528.

When the apparatus 10 receives a facsimile signal representative of source language text, as shown in FIG. 15, a low level routine is executed at a step 540 to uncouple the microprocessor 76 from the phone line, set the facsimile 28 to receive the phone signal, enable the facsimile LCD interrupt and enable a keyboard interrupt. In a step 542, all facsimile key selections are echoed to the facsimile machine 28, with the exception of specialty keys. In a step 554, the facsimile LCD activity is monitored by storing LCD data in controls and decoding data to determine when the transmission has been completed. In a step 546, when the facsimile transmission has been completed, the facsimile is removed from the phone line and control is transferred back to the computer to receive phone line signals. The LCD interrupt is disabled and the keyboard interrupt is enabled. The routine is exited in a step 548.

Figure 16:
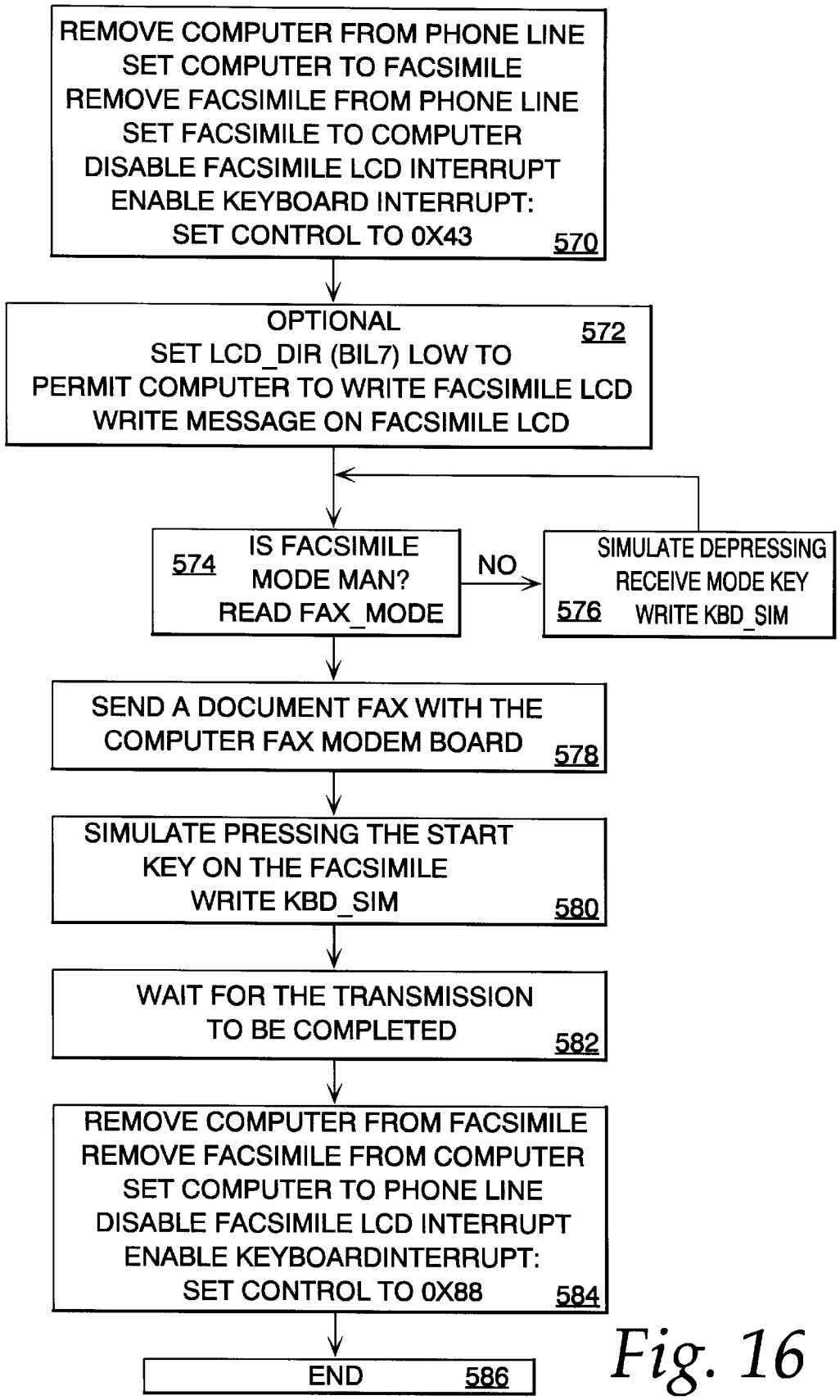
FIG. 16 is a flow chart of the operation of the translating facsimile machine shown in FIG. 1.
Figure 17:
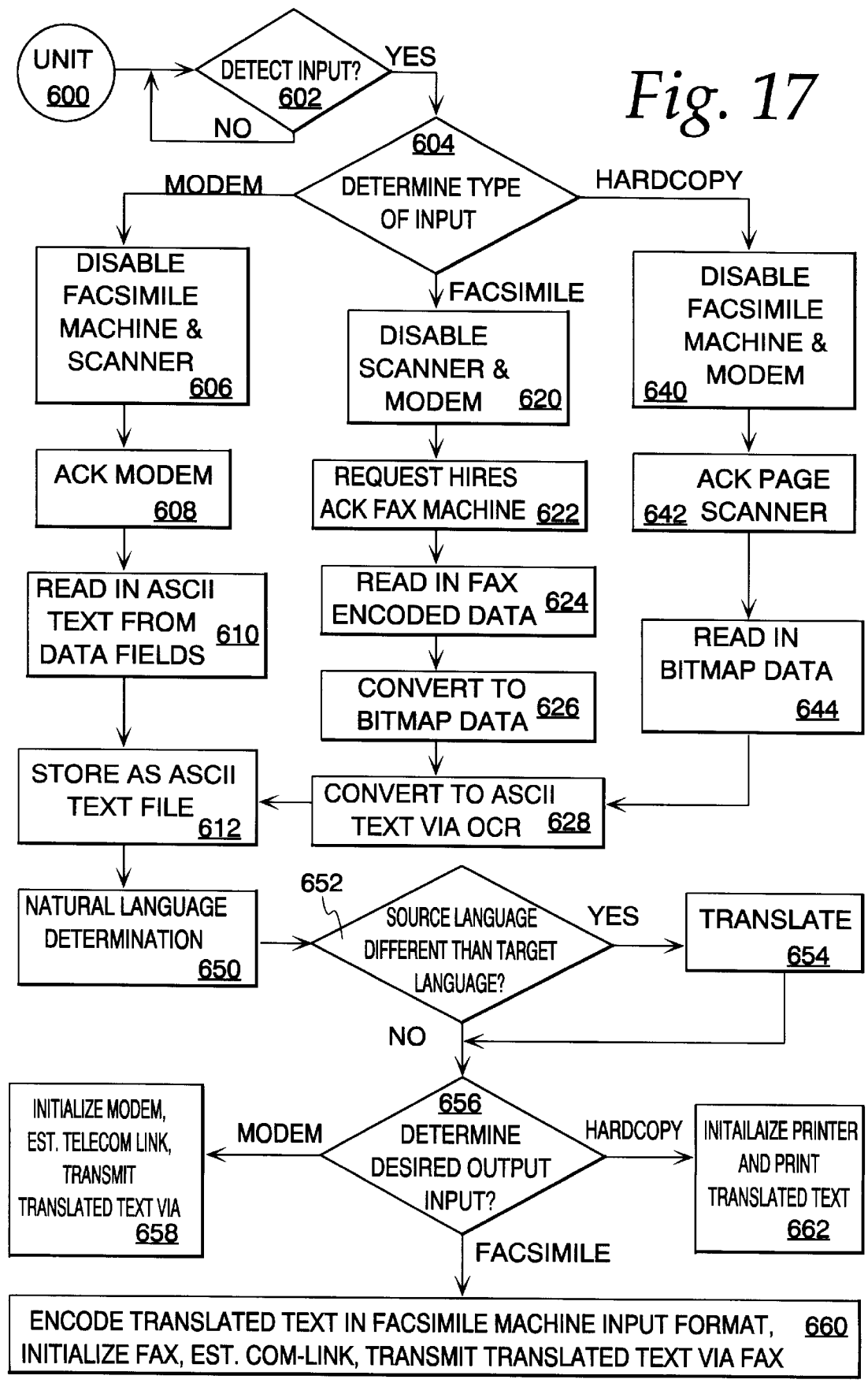
FIG. 17 is a flow chart of the operation of the translating facsimile machine shown in FIG. 1.

When it is desired to perform translation, as will be seen hereinafter, a low level routine as set forth in FIG. 16 is enabled. In a step 570, the computer is uncoupled from the phone line, the computer is coupled to the facsimile machine 28, the facsimile machine 28 is uncoupled from the phone line and the facsimile signal is sent to the computer. The LCD interrupt is disabled and the keyboard interrupts are enabled. Optionally, in a step 572, the LCD may set the computer to write the facsimile LCD. A test is performed in a step 574 to determine whether the facsimile is in manual mode. If it is not, control is transferred to a step 576 to simulate depressing a receive mode key. If it is in manual mode, the read facsimile mode is enabled and a document facsimile may be sent with the computer board in a step 578 by transferring control to a step 580 to simulate pressing a start key on the facsimile. The transmission is awaited to be completed in a step 582 and, when completed, transfers control to a step 584, uncoupling the computer from the facsimile and removing the facsimile from the computer, coupling the computer with the phone line, disabling the facsimile LCD interrupt and enabling the keyboard interrupt. The routine is exited in a step 586.

More specifically, when it is desired to receive a facsimile transmission signal at a higher level, a routine is executed in the random access memory with an initiation step 600, followed by a decision step 602 to determine whether input has been detected. If it has, control is transferred to a decision step 604 to determine whether the input is from a hard copy being scanned by the thermal scanner or from a modem. If the input comes through the modem, control is transferred through a step 606 to disable the facsimile machine and scanner and to generate an acknowledge modem signal in step 608. In the step 610 ASCII text is read in from data fields and stored in the hard drive in the step 612. In the event that a facsimile signal representative of the source natural language text is received, control is transferred from step 604 to a step 620 to disable the scanner and modem and a step 622 to acknowledge the facsimile machine. During the step 622 the apparatus 10 may signal the sending system that contacts it to send its image transmission in high resolution or "fine" mode. This would allow the apparatus 10 to translate more accurately than from text images received at normal resolution. Data in the form of a facsimile signal is read in in a step 624 and converted to bit mapped data signal in a step 626. The bit mapped data signal is converted by an optical character recognition program, such as Winfax Pro or optical character recognition software of the type that may be purchased from Caere Corporation, to an ASCII text signal of the source natural language text in a step 628 and then passed to the step 612.

If hard copy is being scanned, control is transferred to a step 640 to disable the facsimile machine and modem. The page scanner output is acknowledged at a step 642 and bit mapped data is read in a step 644. Control is then transferred to the step 628 to convert the bit mapped data to ASCII text which is stored on a hard drive in step 612. In a step 650, following step 612, a determination is made as to the source natural language, for instance to determine whether the language is in English or French. If the source natural language is different than the target language as determined by a decision in the step 652, a translation engine is started in a step 654, the details of which will be discussed hereafter. If the source natural language is identical to the target natural language, control is transferred to a decision block 656 to determine whether output is desired through a modem in the step 658 to a translated facsimile in a step 660 or to the printer in a step 662.

Figure 18:
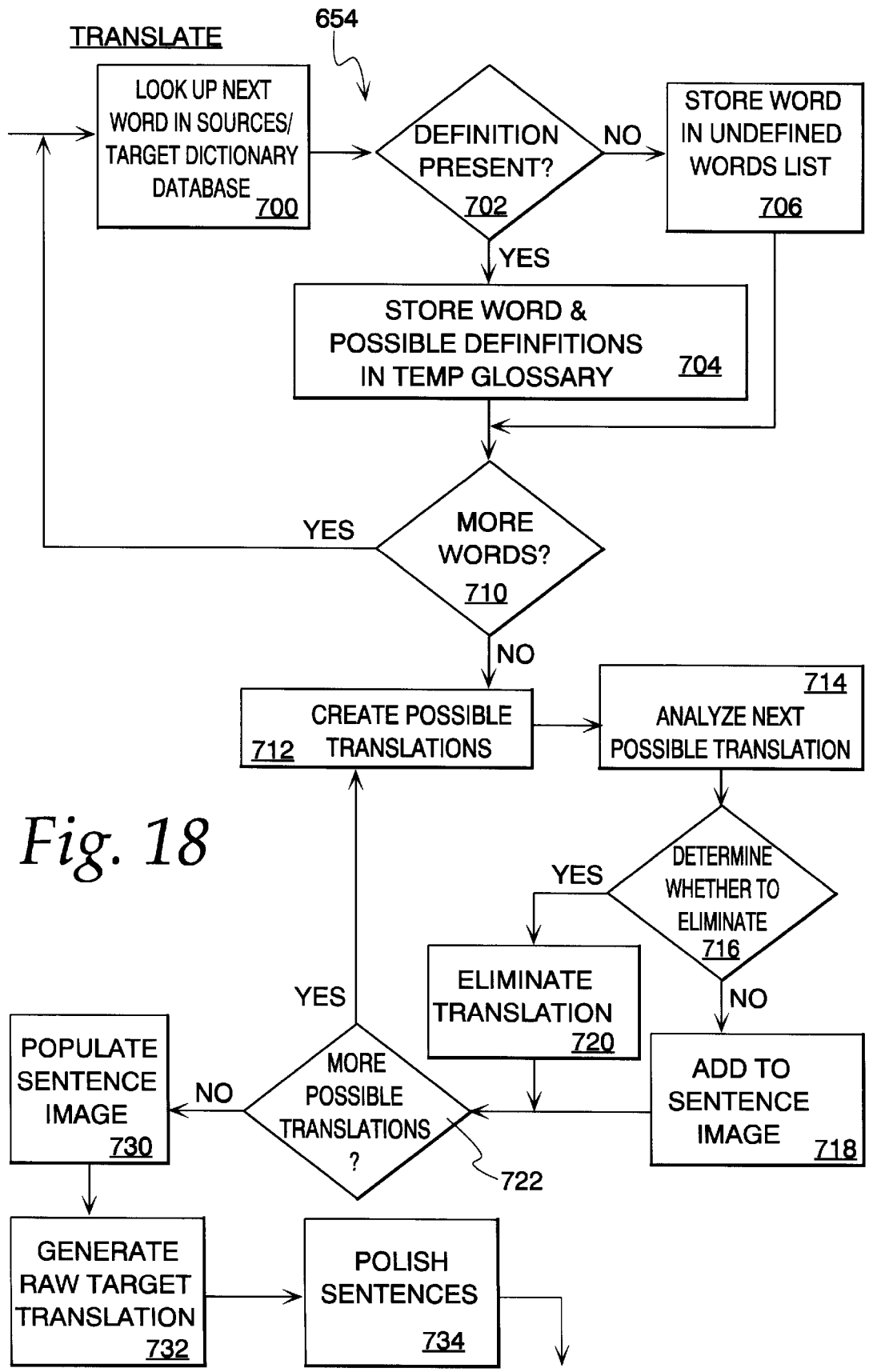
FIG. 18 is a flow chart of the translating steps performed by the translating facsimile machine shown in FIG. 1.

Referring now to FIG. 18, a translation routine 654 is generally shown therein and begins with a step 700 in which the next word in the source target dictionary is looked up. If a definition is present, as determined by a comparison step 602, control is transferred to a step 704 to store word and possible definitions in a temporary glossary. If the definition is not present, the words are stored in an undefined text area on the disk in a step 706.

The splitter module divides the text into paragraphs, sentences and separate words. Words are classified in four categories: alphabetic, figures and numbers, punctuation, and hybrids. The lemmatizer or dictionary access module starts from words defined by the previous module and establishes a list of possible translations for each word, along with compound expressions, if any.

The semantic disambiguation module determines optimal translations and eliminates those which have no relevance in the context. The system keeps track of related contextual words use in the overall text, the paragraphs, and the sentence currently being analyzed. Context words receive a weight proportional to the inverse square of their distance to the ambiguous word. Such disambiguation is not dependent upon a binary decision, but rather a selection based on a large number of possible levels, constantly and gradually modified from a sentence to the next, as text flows on. Programming is based on the systematic application of the principles of fuzzy multilevel or two valued logic in order to more closely approximate the linguistic behavior of the human mind.

Control is passed through another decision block 710 to determine whether more words need to be looked up.

If the answer is "yes", control is transferred back to the step 700. If not, control is transferred to a step 712 to create the possible translations via a lexical tree generator. Once the lexical tree generator has generated a multi-dimensional tree structure related to the possible language translation, control is passed to a step 714 to analyze the next possible translation from a different tree structure for the best fit. A comparison step is made in step 716 to determine whether to eliminate one or the other trees. If not, control is transferred to a step 718 to add to a sentence image. If it is desired to eliminate the translation, control is transferred to a step 720, removing that translation. A test is made in the step 722 to determine whether more possible translations should be made. If so, control is transferred back to step 712.

If not, control is transferred to a step 730 to populate a sentence image following which a raw target translation is generated in the step 732. The sentences are polished in a step 734 and then may be output through an appropriate output means. The target language generation module walks through the structured map of the sentence and the module regenerates the sentence in the target language, while applying all grammatical rules (particularly agreement rules in the romance languages). The editing and polishing module takes care of a number of cosmetic operations, such as elision, contractions, etc. At the output of this last module, the target natural language translation is available, and can be forwarded to a monitor or saved to a file for further editing. This file normally includes the text in the source natural language, plus the translated or target natural language text, paragraph by paragraph in order to facilitate post-editing and correction. The overall process is similar to the mechanisms used by a conference interpreter in a simultaneous translation situation.

Figure 19:
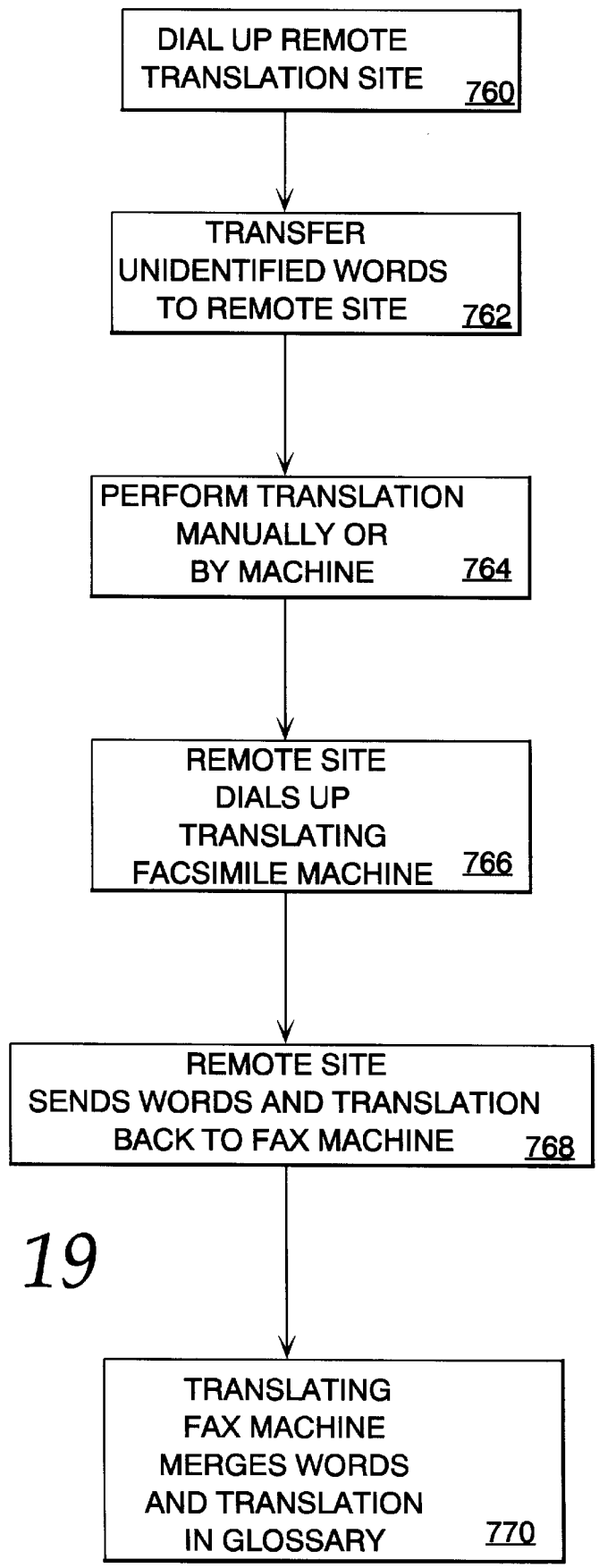
FIG. 19 is a flow chart of the steps taken by the translating facsimile machine and a remote facility to update the source-target language dictionary

As an additional feature the apparatus 10 may take words collected in the database of unidentifiable words and automatically dial a remote site service provider as is provided in step 760 shown in FIG. 19. The words either would be downloaded in facsimile or binary format to the remote service in a step 762. The service provider would then either machine translate or translate manually the unknown words and assign meanings to them in a step 764. The remote site would then dial up the apparatus 10 in a step 766. In a step 768 the newly translated words and their associated target language meanings would then sent by facsimile or binary transmission back to the originating apparatus 10. In a step 770, the originating apparatus 10 would then merge then newly translated words and their meanings into the original database containing the target language dictionary for later use. Such an automated feature would enable to learn automatically and improve its accuracy of translation with experience.

Figure 20:
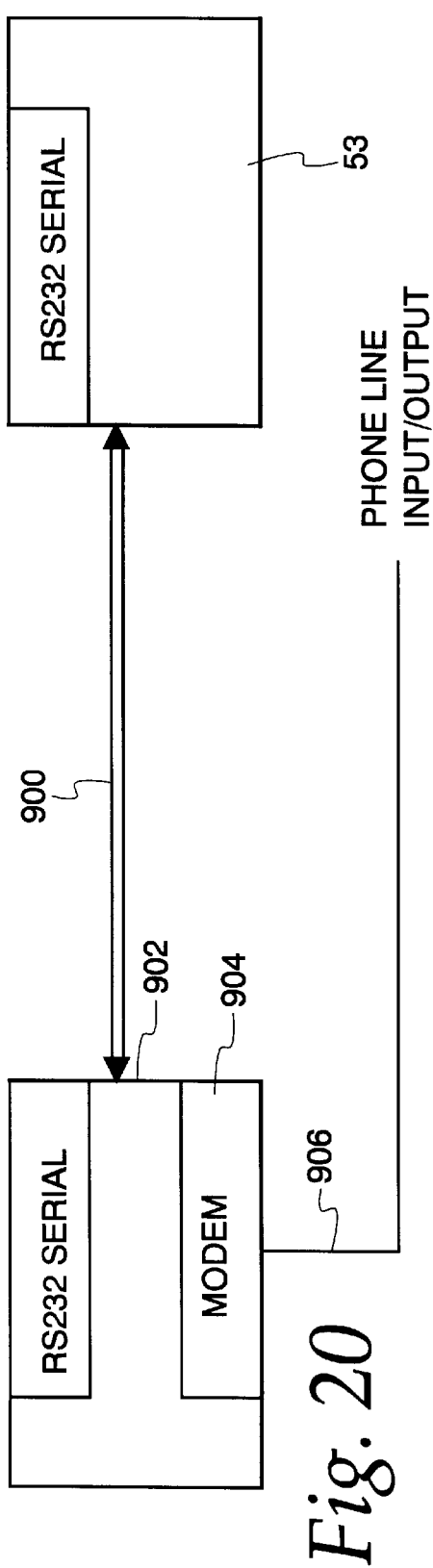
FIG. 20 is a block diagram of an alternative embodiment of the inventive apparatus.

As is shown in FIG. 20, a system can also be constructed wherein generally the computer 53 may be connected via an RS-232 serial line 900 into a facsimile machine 902 having an RS-232 serial port to communicate therewith. The facsimile machine also includes a modem 904 which is connectable to a phone line 906 with which it communicates.

Figure 21:
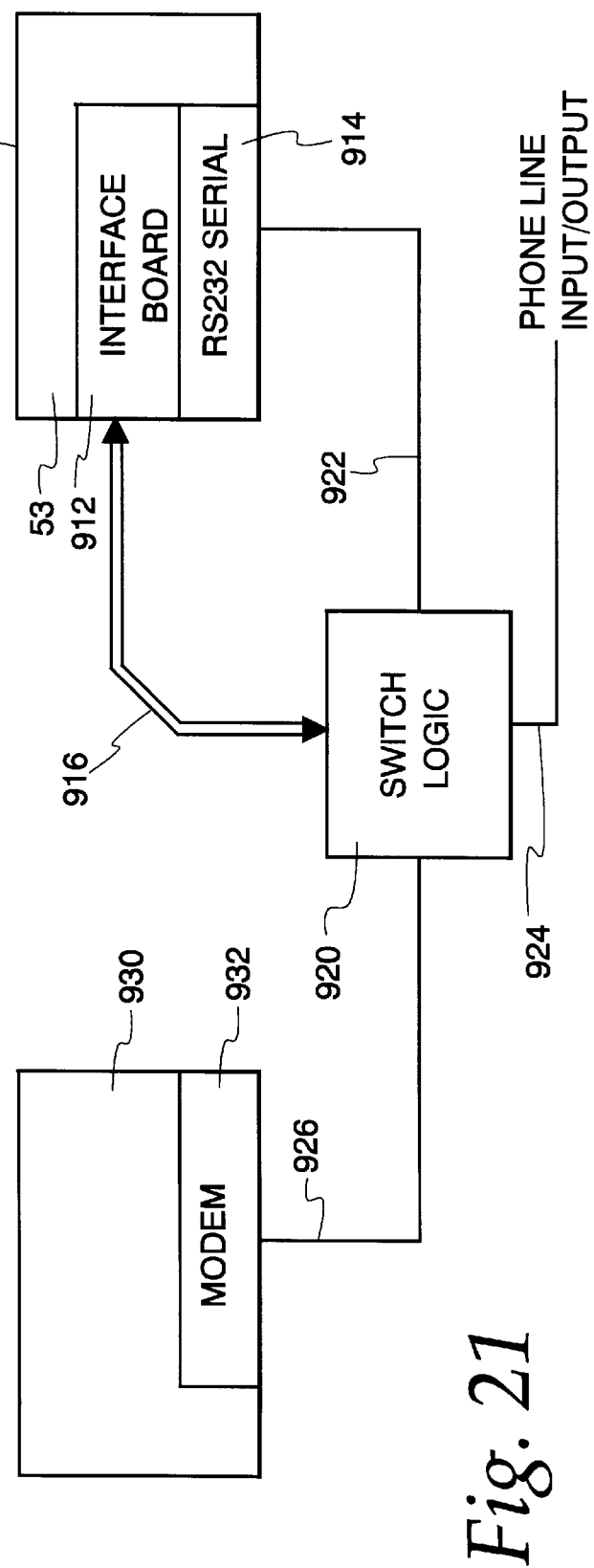
FIG. 21 is a block diagram of a second alternative embodiment of the inventive apparatus.

As is shown in FIG. 21 in a second alternative embodiment, the computer 53 is incorporated in a pedestal unit 910 having an interface board 912 coupled between the computer 53 and a modem 914. A switched logic bus 916 is coupled to switching logic 920 which allows communication of the modem 914 via a line 922 either with a phone line 924 or a line 926. A facsimile machine 930 having modem 932 is coupled to the line 926.

Figure 22:
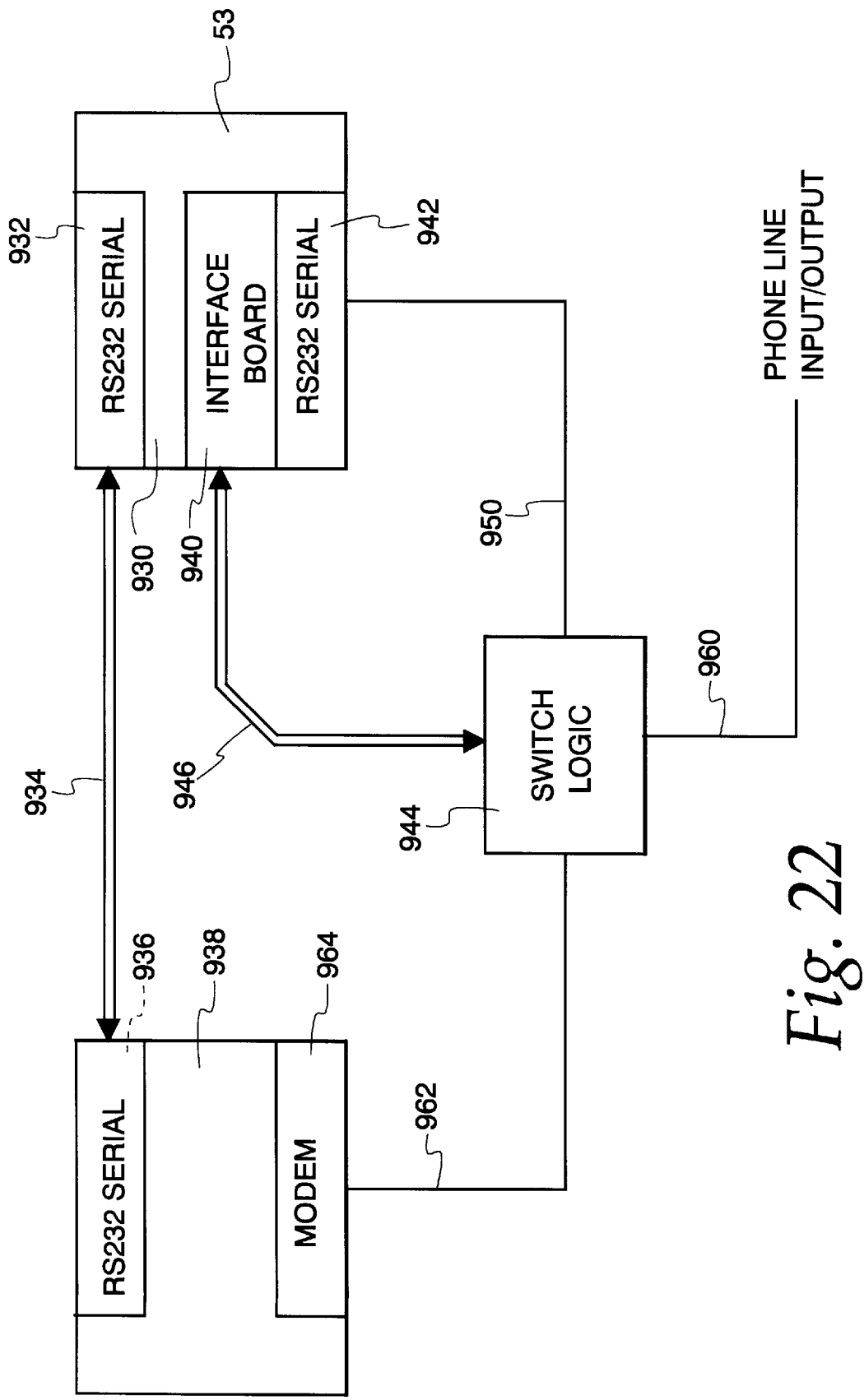
FIG. 22 is a block diagram of a third alternative embodiment of the inventive apparatus.

In a third alternative embodiment, as is shown in FIG. 22, a pedestal unit 930, including the computer 53, has an RS-232 serial communications system 932 connected via a line 934 with an RS-232 serial communication system 936 of a facsimile machine 938. An interface board 940 couples a modem 942 to the computer 53. Switching logic 944 sends and receives signals, including control signals, via a bus 946 to the interface board 940. In order to control whether modem 942, which is connected via line 950 to the switched logic 944, is fed through the switch logic to the phone line 960 or to a modem line 962 coupled to a modem 964 of the facsimile machine 938.

These three alternative embodiments thus allow a substantially stand-alone computer unit to be connected either by an RS-232 serial communications line with a facsimile machine or via a modem or both.

While there have been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

- 20 -

APPENDIX

;PALASM Design Description

;--------------------------------Declaration Segment----------------------------------------------
TITLE                TransFax U2 chip
PATTERN      A
REVISION     1.1

CHIP         U2      PAL22V10

;--------------------------------PIN Declarations-------------------------------------------------
PIN 1                H_ADD_EN
COMBINATORIAL ; INPUT
PIN 2                A4
COMBINATORIAL ; INPUT
PIN 3                A3
COMBINATORIAL ; INPUT
PIN 4                A2
COMBINATORIAL ; INPUT
PIN 5                A1
COMBINATORIAL ; INPUT
PIN 6                A0
COMBINATORIAL ; INPUT
PIN 7                IOR
COMBINATORIAL ; INPUT
PIN 8                IOW
COMBINATORIAL ; INPUT
PIN 14               EN_DATA
COMBINATORIAL ; OUTPUT
PIN 15               DATA_DIR
COMBINATORIAL ; OUTPUT
PIN 16               RD_LCD
COMBINATORIAL ; OUTPUT
;PIN 17      E_USR
COMBINATORIAL ; OUTPUT
PIN 18               E_MS
COMBINATORIAL ; OUTPUT
PIN 19               E_RELAY
COMBINATORIAL ; OUTPUT
PIN 20               E_MODE
COMBINATORIAL ; OUTPUT
PIN 21               E_DECODE
COMBINATORIAL ; OUTPUT
PIN 22               E_SIM
COMBINATORIAL ; OUTPUT
PIN 23               E_LCD
COMBINATORIAL ; OUTPUT ;--------------------------------Boolean Equation Segment-----------------------------------------
EQUATIONS
/E_RELAY     =       /H_ADD_EN * /A4 * /A3 * /A2 * /A1 * /A0 * /IOW  ;0300H

- 21 -

```
;
/E_MODE      =    /H_ADD_EN * /A4 * /A3 * /A2 * /A1 * A0 * /IOR    ;0301H
                                      +/H_ADD_EN * /A4 * /A3 * A2 *
A1 * A0 * /IOR      ;0307H
;
;E_USR       =    /H_ADD_EN * /A4 * /A3 * /A2 * A1 * /A0 * /IOR    ;0302H
                                      +/H_ADD_EN * /A4 * /A3 * /A2 *
A1 * /A0 * /IOW ;0302H
;
/E_SIM       =                        /H_ADD_EN * /A4 * /A3 * /A2 * A1
* A0 * /IOW     ;0303H
;
/E_LCD       =    /H_ADD_EN * /A4 * /A3 * A2 * /A1 * /A0 * /IOW    ;0304H
;
/E_DECODE    =    /H_ADD_EN * /A4 * /A3 * A2 * /A1 * A0 * /IOR     ;0305H
                                      +/H_ADD_EN * /A4 * /A3 * A2 *
A1 * /A0 * /IOR     ;0306H
;
/E_MS        =                        /H_ADD_EN * /A4 * /A3 * A2 * A1
* /A0 * /IOR    ;0306H
;
/RD_LCD      =    /H_ADD_EN * /A4 * * /A3 * A2 * A1 * A0 * /IOR    ;0307H
;
/EN_DATA     =    /E_RELAY * /IOW + /E_MODE * /IOR
                                      +/E_DECODE * /IOR  + /E_SIM *
/IOW + /E_LCD * /IOW
;
/DATA_DIR    =    /H_ADD_EN * /A4 * /A3 * /A2 * /A1 * A0 * /IOR
                                      +/H_ADD-EN * /A4 * /A3 * /A2 *
A1 * /A0 * /IOR
                                      +/H_ADD_EN * /A4 * /A3 * A2 *
/A1 * A0 * /IOR
                                      +/H_ADD_EN * /A4 * /A3 * A2 *
A1 * /A0 * /IOR
                                      +/H_ADD_EN * /A4 * /A3 * A2 *
A1 * A0 * /IOR
;
;--------------------------------Simulation Segment-------------------------------------------
SIMULATION
TRACE_ON
            H_ADD_EN A4 A3 A2 A1 A0 IOR IOW
            EN_DATA DATA_DIR E_RELAY E_MODE E_DECODE E_SIM E_LCD
;
SETF        H_ADD_EN
SETF        A4 A3 A2 A1 A0
SETF        IOR IOW
SETF        /A4 /A3 /A2 /A1 /A0                    ;0300H
SETF        /H_ADD_EN
SETF        /IOR IOW
SETF        IOR /IOW
SETF        IOR IOW
SETF        H_ADD_EN
SETF        /A4 /A3 /A2 /A1 A0                     ;0301H
SETF        /H_ADD_EN
```

- 22 -

```
      SETF    /IOR IOW
      SETF    IOR /IOW
      SETF    IOR IOW
      SETF    H_ADD_EN
  5   SETF    /A4 /A3 /A2 A1 /A0              ;0302H
      SETF    /H_ADD_EN
      SETF    /IOR IOW
      SETF    IOR /IOW
      SETF    IOR IOW
 10   SETF    H_ADD_EN
      SETF    /A4 /A3 /A2 A1 A0               ;0303H
      SETF    /H_ADD_EN
      SETF    /IOR IOW
      SETF    IOR /IOW
 15   SETF    IOR IOW
      SETF    H_ADD_EN
      SETF    /A4 /A3 A2 /A1 /A0              ;0304H
      SETF    /H_ADD_EN
      SETF    /IOR IOW
 20   SETF    IOR /IOW
      SETF    IOR IOW
      SETF    H_ADD_EN
      SETF    /A4 /A3 A2 /A1 A0               ;0305H
      SETF    /H_ADD_EN
 25   SETF    /IOR IOW
      SETF    IOR /IOW
      SETF    IOR IOW
      SETF    H_ADD_EN
      SETF    /A4 /A3 A2 A1 /A0               ;0306H
 30   SETF    /H_ADD_EN
      SETF    /IOR IOW
      SETF    IOR /IOW
      SETF    IOR IOW
      SETF    H_ADD_EN
 35   SETF    /A4 /A3 A2 A1 A0                ;0307H
      SETF    /H_ADD_EN
      SETF    /IOR IOW
      SETF    IOR /IOW
      SETF    IOR IOW
 40   ;
      TRACE_OFF
;-----------------------------------------------------------------------------

;PALASM Design Description

;--------------------------------Declaration Segment----------------------------
 45   TITLE              TransFax U9 chip
      PATTERN    A
      REVISION   1.1

CHIP       U9    PAL22V10

;--------------------------------PIN Declarations------------------------------
```

- 23 -

```
    PIN 1              A_LD7
    COMBINATORIAL ; INPUT
    ;PIN 2             A_RS
    COMBINATORIAL ; INPUT
 5  PIN 3              A_LD6
    COMBINATORIAL ; INPUT
    PIN 4              A_RW
    COMBINATORIAL ; INPUT
    PIN 5              A_LD5
10  COMBINATORIAL ; INPUT
    PIN 6              A_E
    COMBINATORIAL ; INPUT
    PIN 7              A_LD4
    COMBINATORIAL ; INPUT
15  PIN 8              DIR_IN
    COMBINATORIAL ; INPUT
    ;PIN 10     B_RS
    COMBINATORIAL ; INPUT
    PIN 13             B_RW
20  COMBINATORIAL ; INPUT
    PIN 14             B_LD5
    COMBINATORIAL ; IO
    PIN 15             A_E_OUT
    COMBINATORIAL ; OUTPUT
25  PIN 16             B_LD4
    COMBINATORIAL ; IO
    PIN 17             C_LD4
    COMBINATORIAL ; IO
    PIN 18             B_LD6
30  COMBINATORIAL ; IO
    PIN 19             C_LD5
    COMBINATORIAL ; IO
    PIN 20             B_LD7
    COMBINATORIAL ; IO
35  PIN 21             C_LD6
    COMBINATORIAL ; IO
    PIN 22             DIR_OUT
    COMBINATORIAL ; IO
    PIN 23             C_LD7
40  COMBINATORIAL ; IO
    ;--------------------------------Boolean Equation Segment---------------------------------
    EQUATIONS
    ;
    DIR_OUT            =              B_RW * DIR_IN + A_RW * /DIR_IN
45  ;
    ;
    C_LD4.TRST         =              /DIR_OUT
    C_LD5.TRST         =              /DIR_OUT
    C_LD6.TRST         =              /DIR_OUT
50  C_LD7.TRST         =              /DIR_OUT
    ;
    ;
    B_LD4.TRST         =              DIR_OUT * DIR_IN
    B_LD5.TRST         =              DIR_OUT * DIR_IN
```

- 24 -

```
     B_LD6.TRST    =                             DIR_OUT * DIR_IN
     B_LD7.TRST    =                             DIR_OUT * DIR_IN
     ;
     ;
  5  C_LD4         =                             B_LD4 * DIR_IN + A_LD4 * /DIR_IN
     ;
     C_LD5         =                             B_LD5 * DIR_IN + A_LD5 * /DIR_IN
     ;
     C_LD6         =                             B_LD6 * DIR_IN + A_LD6 * /DIR/IN
 10  ;
     C_LD7         =                             B_LD7 * DIR_IN + A_LD7 * /DIR_IN
     ;
     ;
     B_LD4         =                             C_LD4
 15  ;
     B_LD5         =                             C_LD5
     ;
     B_LD6         =                             C_LD6
     ;
 20  B_LD7         =                             C_LD7
     ;
     A_E_OUT    =    A_E * DIR_IN * /A_RW
     ;
     ;--------------------------------Simulation Segment--------------------------------
 25  SIMULATION
     TRACE_ON
                                                 A_RW DIR_IN B_RW
                                                 A_LD4 A_LD5 A_LD6 A_LD7
                                                 B_LD4 B_LD5 B_LD6 B_LD7
 30                                              C_LD4 C_LD5 C_LD6 C_LD7
                                                 A_E A_E_OUT
     ;
     SETF                                        /DIR_IN A_RW /B_RW A_E
     ;
 35  SETF                                        C_LD4 C_LD5 C_LD6 C_LD7
     ;
     SETF                                        /C_LD4 C_LD5 C_LD6 C_LD7
     ;
     SETF                                        C_LD4 /C_LD5 C_LD6 C_LD7
 40  ;
     SETF                                        C_LD4 C_LD5 /C_LD6 C_LD7
     ;
     SETF                                        C_LD4 C_LD5 C_LD6 /C_LD7
     ;
 45  ;
     SETF                                        /A_RW
     ;
     SETF                                        A_LD4 A_LD5 A_LD6 A_LD7
     ;
 50  SETF                                        /A_LD4 A_LD5 A_LD6 A_LD7
     ;
     SETF                                        A_LD4 /A_LD5 A_LD6 A_LD7
     ;
     SETF                                        A_LD4 A_LD5 /A_LD6 A_LD7
```

```
        ;
        SETF                            A_LD4 A_LD5 A_LD6 /A_LD7
        ;
 5      SETF                            A_RW DIR_IN B_RW
        ;
        SETF                            C_LDR C_LD5 C_LD6 C_LD7
        ;
        SETF                            /C_LD4 C_LD5 C_LD6 C_LD7
10      ;
        SETF                            C_LD4 /C_LD5 C_LD6 C_LD7
        ;
        SETF                            C_LD4 C_LD5 /C_LD6 C_LD7
        ;
15      SETF                            C_LD4 C_LD5 C_LD6 /C_LD7
        ;
        ;
        SETF                            /B_RW /A_RW
        ;
20      SETF                            B_LD4 B_LD5 B_LD6 B_LD7
        ;
        SETF                            /B_LD4 B_LD5 B_LD6 B_LD7
        ;
        SETF                            B_LD4 /B_LD5 B_LD6 B_LD7
25      ;
        SETF                            B_LD4 B_LD5 /B_LD6 B_LD7
        ;
        SETF                            B_LD4 B_LD5 B_LD6 /B_LD7
        ;
30      ;
        ;
        ;
        TRACE_OFF
35      ;------------------------------------------------------------------------------------
        ;PALASM Design Description
        ;
        ;----------------------------Declaration Segment--------------------------------------
        TITLE           TransFax U1 chip
40      PATTERN     A
        REVISION    1.1

CHIP        U1   PAL22V10

;----------------------------PIN Declarations-----------------------------------------
        PIN 1                A15
45      COMBINATORIAL ; INPUT
        PIN 2                A14
        COMBINATORIAL ; INPUT
        PIN 3                A13
        COMBINATORIAL ; INPUT
50      PIN 4                A12
        COMBINATORIAL ; INPUT
```

```
                          - 26 -

PIN 5              A11
       COMBINATORIAL ; INPUT
       PIN 6              A10
       COMBINATORIAL ; INPUT
  5    PIN 7              A9
       COMBINATORIAL ; INPUT
       PIN 8              A8
       COMBINATORIAL ; INPUT
       PIN 9              A7
 10    COMBINATORIAL ; INPUT
       PIN 10             A6
       COMBINATORIAL ; INPUT
       PIN 11             A5
       COMBINATORIAL ; INPUT
 15    PIN 13             AEN
       COMBINATORIAL ; INPUT
       PIN 14             IOR
       COMBINATORIAL ; INPUT
       PIN 15             IOW
 20    COMBINATORIAL ; INPUT
       PIN 16             MEMR
       COMBINATORIAL ; INPUT
       PIN 17             MEMW
       COMBINATORIAL ; INPUT
 25    PIN 19             /H_ADD_EN
       COMBINATORIAL ; OUTPUT
       ;PIN 20      S5
       COMBINATORIAL ; OUTPUT
       ;PIN 21      IS5
 30    COMBINATORIAL ; INPUT
       ;PIN 22      S4
       COMBINATORIAL ; OUTPUT
       ;PIN 23      IS4
       COMBINATORIAL ; INPUT
 35    ;---------------------------Boolean Equation Segment----------------------------------
       EQUATIONS
       ;
       H_ADD_EN    =     /A15 * /A14 * /A13 * /A12 * /A11 * /A10 * A9 *
                                                      A8 * /A7 * /A6 * /A5 * /AEN * /IOR
 40    * MEMR * MEMW
                                                   + /A15 * /A14 * /A13 * /A12 *
       /A11 */A10 * A9 *
                                                      A8 * /A7 * /A6 * /A5 * /AEN * /IOW
       * MEMR * MEMW
 45    ;S4                =                         /IS4
       ;S5                =                         /IS5
       ;
       ;---------------------------Simulation Segment----------------------------------
       SIMULATION
 50    TRACE_ON    /A5 /A6 /A7 /A8 /A9 /A10 /A11 /A12 /A13 /A14 /A15 /AEN
                          IOR IOW MEMR MEMW
                          S4 IS4 S5 IS5
       ;
       ;
```

- 27 -

```
     SETF      IOR IOW MEMR MEMW
     SETF      /A5 /A6 /A7 /A8 /A9 /A10 /A11 /A12 /A13 /A14 /A15 /AEN
     SETF      IOR /IOW MEMR MEMW
     SETF      /IOR IOW MEMR MEMW
  5  SETF      /IOR /IOW /MEMR /MEMW
     SETF      IOR IOW MEMR MEMW
     SETF      /A5 /A6 /A7 A8 A9 /A10 /A11 /A12 /A13 /A14 /A15 /AEN
     SETF      IOR /IOW MEMR MEMW
     SETF      /IOR IOW MEMR MEMW
 10  SETF      /IOR /IOW /MEMR /MEMW
     SETF      IOR IOW MEMR MEMW
     SETF      /A5 /A6 /A7 A8 A9 /A10 /A11 /A12 /A13 /A14 /A15 /AEN
     SETF      IOR /IOW MEMR MEMW
     SETF      /IOR IOW MEMR MEMW
 15  SETF      /IOR /IOW /MEMR /MEMW
     SETF      IOR IOW MEMR MEMW
     SETF      /A5 /A6 /A7 A8 A9 /A10 /A11 /A12 /A13 /A14 /A15 /AEN
     SETF      IOR /IOW MEMR MEMW
     SETF      /IOR IOW MEMR MEMW
 20  SETF      /IOR /IOW /MEMR /MEMW
     SETF      IOR IOW MEMR MEMW
     SETF      /A5 /A6 /A7 A8 A9 /A10 /A11 /A12 /A13 /A14 /A15 /AEN
     SETF      IOR /IOW MEMR MEMW
     SETF      /IOR IOW MEMR MEMW
 25  SETF      /IOR /IOW /MEMR/ MEMW
     SETF      IOR IOW MEMR MEMW
     SETF      /A5 /A6 /A7 A8 A9 /A10 /A11 /A12 /A13 /A14 /A15 AEN
     SETF      IOR /IOW MEMR MEMW
     SETF      /IOR IOW MEMR MEMW
 30  SETF      /IOR /IOW /MEMR /MEMW
     SETF      IOR IOW MEMR MEMW
     SETF      /A5 /A6 /A7 A8 A9 /A10 /A11 /A12 /A13 /A14 /A15 AEN
     SETF      IOR /IOW MEMR MEMW
     SETF      /IOR IOW MEMR MEMW
 35  SETF      /IOR /IOW /MEMR /MEMW
     SETF      IOR IOW MEMR MEMW
     SETF      /A5 /A6 /A7 /A8 /A9 /A10 /A11 /A12 /A13 /A14 /A15 AEN
     SETF      IOR /IOW MEMR MEMW
     SETF      /IOR IOW MEMR MEMW
 40  SETF      /IOR /IOW /MEMR /MEMW
     SETF      IOR IOW MEMR MEMW
     SETF      /A5 /A6 /A7 A8 A9 /A10 /A11 /A12 /A13 /A14 /A15 /AEN
     SETF      IOR /IOW MEMR MEMW
     SETF      /IOR IOW MEMR MEMW
 45  SETF      /IOR /IOW /MEMR /MEMW
     SETF      IOR IOW MEMR MEMW
     ;SETF     IS4 IS5
     ;SETF     /IS4 IS5
     ;SETF     IS4 /IS5
 50  ;SETF     IS4 IS5
     ;
     TRACE_OFF
;------------------------------------------------------------------------------
;PALASM Design Description
```

- 28 -

```
;---------------------------------Declaration Segment---------------------------------------
   TITLE          TransFax U6 chip
   PATTERN    A
   REVISION   1.1

5  CHIP          U6    PAL22V10

;---------------------------------PIN Declarations----------------------------------------
   PIN 1              A_RS
   COMBINATORIAL ; INPUT
   PIN 2              A_RW
10 COMBINATORIAL ; INPUT
   PIN 3              A_E
   COMBINATORIAL ; INPUT
   PIN 4              DIR_IN
   COMBINATORIAL ; INPUT
15 PIN 5              B_RS
   COMBINATORIAL ; INPUT
   PIN 6              B_RW
   COMBINATORIAL ; INPUT
   PIN 7              B_E
20 COMBINATORIAL ; INPUT
   PIN 8              AM
   COMBINATORIAL ; INPUT
   PIN 9              MAN
   COMBINATORIAL ; INPUT
25 PIN 10             AUTO
   COMBINATORIAL ; INPUT
   PIN 11             RDD_LCD
   COMBINATORIAL ; INPUT
   PIN 13             E_LCD_INT
30 COMBINATORIAL ; INPUT
   PIN 14             C_RW
   COMBINATORIAL ; OUTPUT
   PIN 15             C_RS
   COMBINATORIAL ; OUTPUT
35 PIN 16             C_E
   COMBINATORIAL ; OUTPUT
   PIN 17             B6
   COMBINATORIAL ; OUTPUT
   PIN 18             B7
40 COMBINATORIAL ; OUTPUT
   PIN 19             B8
   COMBINATORIAL ; OUTPUT
   PIN 20             E_KBD_INT
   COMBINATORIAL ; OUTPUT
45 PIN 21             KBD_INT
   COMBINATORIAL ; OUTPUT
   PIN 22             LCD_INT
   COMBINATORIAL ; OUTPUT
   PIN 23             KBD_IN
50 COMBINATORIAL ; INPUT
   ;
   ;---------------------------------Boolean Equation Segment--------------------------------
```

- 29 -

```
     EQUATIONS
     C_E              =              A_E * /DIR_IN + B_E * DIR_IN
     ;
     C_RW             =              A_RW * /DIR_IN + B_RW * DIR_IN
 5   ;
     C_RS             =              A_RS * /DIR_IN + B_RS * DIR_IN
     ;
     B8               =              AUTO * RD_LCD + B_E * /RD_LCD
     ;
10   B7               =              MAN * RD_LCD + B_RW * /RD_LCD
     ;
     B6               =              AM * RD_LCD + B_RS * /RD_LCD
     ;
     /KBD_INT   =     /KBD_IN * /E_KBD_INT
15   ;
     /LCD_INT   =     B_E * /E_LCD_INT
     ;
     ;----------------------------------Simulation Segment-----------------------------------------
     SIMULATION
20   TRACE_ON
                      A_E A_RW A_RS DIR_IN
                      B_E B_RW B_RS
                      C_E C_RW C_RS
                      AUTO MAN AM RD_LCD
25                    E_KBD_INT E_LCD_INT KBD_IN KBD_INT LCD_INT
     ;
     SETF             E_KBD_INT E_LCD_INT KBD_IN
     SETF             A_E A_RW A_RS DIR_IN B_E B_RW B_RS AUTO MAN AM / RD_LCD
     SETF             B_E B_RW B_RS
30   SETF             /B_E B_RW B_RS
     SETF             B_E /B_RW B_RS
     SETF             B_E B_RW /B_RS
     SETF             /B_E /B_RW /B_RS
     ;
35   SETF             /DIR_IN
     SETF             /A_E A_RW A_RS
     SETF             A_E /A_RW A_RS
     SETF             A_E A_RW /A_RS
     SETF             /A_E /A_RW /A_RS
40   ;
     SETF             RD_LCD
     SETF             /AUTO MAN AM
     SETF             AUTO /MAN AM
     SETF             AUTO MAN /AM
45   ;
     SETF             /E_KBD_INT E_LCD_INT KBD_IN
     SETF             /E_KBD_INT E_LCD_INT /KBD_IN
     SETF             /E_KBD_INT /E_LCD_INT KBD_IN
     SETF             E_KBD_INT /E_LCD_INT /KBD_IN
50   SETF             E_KBD_INT /E_LCD_INT KBD_IN B_E
     SETF             E_KBD_INT E_LCD_INT KBD_IN
     ;
     TRACE_OFF
     ;----------------------------------------------------------------------------------------------
```

```
;PALASM Design Description

;--------------------------------Declaration Segment--------------------------------------------
    TITLE            TransFax U14 chip
    PATTERN     A
5   REVISION    1.1

CHIP        U14   PAL22V10

;--------------------------------PIN Declarations----------------------------------------------
    PIN 1            CLOCK                              COMBINATORIAL; INPUT
    PIN 12           GND
10  PIN 14           BIT1                                       REGISTERED; IO
    PIN 15           BIT2                                       REGISTERED; IO
    PIN 16           BIT3                                       REGISTERED; IO
    PIN 17           BIT4                                       REGISTERED; IO
    PIN 18           BIT5                                       REGISTERED; IO
15  PIN 19           BIT6                                       REGISTERED; IO
    PIN 20           BITA                                       REGISTERED; IO
    PIN 21           BITB                                       REGISTERED; IO
    PIN 22           BITC                                       REGISTERED; IO
    PIN 23           BITD                                       REGISTERED; IO
20  PIN 24           VCC                                        REGISTERED; IO ;--------------------------------Boolean Equation Segment---------------------------------
    EQUATIONS
    ;
;--------------------------------State Segment-------------------------------------------------
25  STATE
    MEALY_MACHINE
    START_UP := POWER_UP -> STATE0
    START_UP.OUTF := GND => BITA * BITB * BITC * BITD
    ;
30  START_UP.OUTF := GND ->                    /BIT1 * /BIT2 * /BIT3 * /BIT4 * /BIT5
    * /BIT6
    ;
    STATE0      = /BIT1 * /BIT2 * /BIT3 * /BIT4 * /BIT5 * /BIT6
    STATE1      =  BIT1 * /BIT2 * /BIT3 * /BIT4 * /BIT5 * /BIT6
35  STATE2      = /BIT1 *  BIT2 * /BIT3 * /BIT4 * /BIT5 * /BIT6
    STATE3      =  BIT1 *  BIT2 * /BIT3 * /BIT4 * /BIT5 * /BIT6
    STATE4      = /BIT1 * /BIT2 *  BIT3 * /BIT4 * /BIT5 * /BIT6
    STATE5      =  BIT1 * /BIT2 *  BIT3 * /BIT4 * /BIT5 * /BIT6
    STATE6      = /BIT1 *  BIT2 *  BIT3 * /BIT4 * /BIT5 * /BIT6
40  STATE7      =  BIT1 *  BIT2 *  BIT3 * /BIT4 * /BIT5 * /BIT6
    STATE8      = /BIT1 * /BIT2 * /BIT3 *  BIT4 * /BIT5 * /BIT6
    STATE9      =  BIT1 * /BIT2 * /BIT3 *  BIT4 * /BIT5 * /BIT6
    STATE10     = /BIT1 *  BIT2 * /BIT3 *  BIT4 * /BIT5 * /BIT6
    STATE11     =  BIT1 *  BIT2 * /BIT3 *  BIT4 * /BIT5 * /BIT6
45  STATE12     = /BIT1 * /BIT2 *  BIT3 *  BIT4 * /BIT5 * /BIT6
    STATE13     =  BIT1 * /BIT2 *  BIT3 *  BIT4 * /BIT5 * /BIT6
    STATE14     = /BIT1 *  BIT2 *  BIT3 *  BIT4 * /BIT5 * /BIT6
    STATE15     =  BIT1 *  BIT2 *  BIT3 *  BIT4 * /BIT5 * /BIT6
    STATE16     = /BIT1 * /BIT2 * /BIT3 * /BIT4 *  BIT5 * /BIT6
50  STATE17     =  BIT1 * /BIT2 * /BIT3 * /BIT4 *  BIT5 * /BIT6
```

- 31 -

```
        STATE18    = /BIT1 *  BIT2 * /BIT3 * /BIT4 *  BIT5 * /BIT6
        STATE19    =  BIT1 *  BIT2 * /BIT3 * /BIT4 *  BIT5 * /BIT6
        STATE20    = /BIT1 * /BIT2 *  BIT3 * /BIT4 *  BIT5 * /BIT6
        STATE21    =  BIT1 * /BIT2 *  BIT3 * /BIT4 *  BIT5 * /BIT6
 5      STATE22    = /BIT1 *  BIT2 *  BIT3 * /BIT4 *  BIT5 * /BIT6
        STATE23    =  BIT1 *  BIT2 *  BIT3 * /BIT4 *  BIT5 * /BIT6
        STATE24    = /BIT1 * /BIT2 * /BIT3 *  BIT4 *  BIT5 * /BIT6
        STATE25    =  BIT1 * /BIT2 * /BIT3 *  BIT4 *  BIT5 * /BIT6
        STATE26    = /BIT1 *  BIT2 * /BIT3 *  BIT4 *  BIT5 * /BIT6
10      STATE27    =  BIT1 *  BIT2 * /BIT3 *  BIT4 *  BIT5 * /BIT6
        STATE28    = /BIT1 * /BIT2 *  BIT3 *  BIT4 *  BIT5 * /BIT6
        STATE29    =  BIT1 * /BIT2 *  BIT3 *  BIT4 *  BIT5 * /BIT6
        STATE30    = /BIT1 *  BIT2 *  BIT3 *  BIT4 *  BIT5 * /BIT6
        STATE31    =  BIT1 *  BIT2 *  BIT3 *  BIT4 *  BIT5 * /BIT6
15      STATE32    = /BIT1 * /BIT2 * /BIT3 * /BIT4 * /BIT5 *  BIT6
        STATE33    =  BIT1 * /BIT2 * /BIT3 * /BIT4 * /BIT5 *  BIT6
        STATE34    = /BIT1 *  BIT2 * /BIT3 * /BIT4 * /BIT5 *  BIT6
        STATE35    =  BIT1 *  BIT2 * /BIT3 * /BIT4 * /BIT5 *  BIT6
        STATE36    = /BIT1 * /BIT2 *  BIT3 * /BIT4 * /BIT5 *  BIT6
20      STATE37    =  BIT1 * /BIT2 *  BIT3 * /BIT4 * /BIT5 *  BIT6
        STATE38    = /BIT1 *  BIT2 *  BIT3 * /BIT4 * /BIT5 *  BIT6
        STATE39    =  BIT1 *  BIT2 *  BIT3 * /BIT4 * /BIT5 *  BIT6
        STATE40    = /BIT1 * /BIT2 * /BIT3 *  BIT4 * /BIT5 *  BIT6
        STATE41    =  BIT1 * /BIT2 * /BIT3 *  BIT4 * /BIT5 *  BIT6
25      STATE42    = /BIT1 *  BIT2 * /BIT3 *  BIT4 * /BIT5 *  BIT6
        STATE43    =  BIT1 *  BIT2 * /BIT3 *  BIT4 * /BIT5 *  BIT6
        STATE44    = /BIT1 * /BIT2 *  BIT3 *  BIT4 * /BIT5 *  BIT6
        STATE45    =  BIT1 * /BIT2 *  BIT3 *  BIT4 * /BIT5 *  BIT6
        STATE46    = /BIT1 *  BIT2 *  BIT3 *  BIT4 * /BIT5 *  BIT6
30      STATE47    =  BIT1 *  BIT2 *  BIT3 *  BIT4 * /BIT5 *  BIT6
        STATE48    = /BIT1 * /BIT2 * /BIT3 * /BIT4 *  BIT5 *  BIT6
        STATE49    =  BIT1 * /BIT2 * /BIT3 * /BIT4 *  BIT5 *  BIT6
        STATE50    = /BIT1 *  BIT2 * /BIT3 * /BIT4 *  BIT5 *  BIT6
        STATE51    =  BIT1 *  BIT2 * /BIT3 * /BIT4 *  BIT5 *  BIT6
35      STATE52    = /BIT1 * /BIT2 *  BIT3 * /BIT4 *  BIT5 *  BIT6
        STATE53    =  BIT1 * /BIT2 *  BIT3 * /BIT4 *  BIT5 *  BIT6
        STATE54    = /BIT1 *  BIT2 *  BIT3 * /BIT4 *  BIT5 *  BIT6
        STATE55    =  BIT1 *  BIT2 *  BIT3 * /BIT4 *  BIT5 *  BIT6
        STATE56    = /BIT1 * /BIT2 * /BIT3 *  BIT4 *  BIT5 *  BIT6
40      STATE57    =  BIT1 * /BIT2 * /BIT3 *  BIT4 *  BIT5 *  BIT6
        STATE58    = /BIT1 *  BIT2 * /BIT3 *  BIT4 *  BIT5 *  BIT6
        STATE59    =  BIT1 *  BIT2 * /BIT3 *  BIT4 *  BIT5 *  BIT6
        STATE60    = /BIT1 * /BIT2 *  BIT3 *  BIT4 *  BIT5 *  BIT6
        STATE61    =  BIT1 * /BIT2 *  BIT3 *  BIT4 *  BIT5 *  BIT6
45      STATE62    = /BIT1 *  BIT2 *  BIT3 *  BIT4 *  BIT5 *  BIT6
        STATE63    =  BIT1 *  BIT2 *  BIT3 *  BIT4 *  BIT5 *  BIT6
        ;
        ;OUTPUT EQUATIONS-----------------------------------------------------------
        ;
50      STATE0.OUTF     = GO -> /BITA * /BITB * /BITC * /BITD
        STATE1.OUTF     = GO -> /BITA * /BITB * /BITC * /BITD
        STATE2.OUTF     = GO -> /BITA * /BITB * /BITC * /BITD
        STATE3.OUTF     = GO -> /BITA * /BITB * /BITC * /BITD
        STATE4.OUTF     = GO -> /BITA * /BITB * /BITC * /BITD
```

- 32 -

```
STATE5.OUTF      = GO -> /BITA * /BITB * /BITC * /BITD
;
STATE6.OUTF      = GO ->  BITA * /BITB * /BITC * /BITD
STATE7.OUTF      = GO ->  BITA * /BITB * /BITC * /BITD
STATE8.OUTF      = GO ->  BITA * /BITB * /BITC * /BITD
STATE9.OUTF      = GO ->  BITA * /BITB * /BITC * /BITD
STATE10.OUTF     = GO ->  BITA * /BITB * /BITC * /BITD
STATE11.OUTF     = GO ->  BITA * /BITB * /BITC * /BITD
;
STATE12.OUTF     = GO -> /BITA *  BITB * /BITC * /BITD
STATE13.OUTF     = GO -> /BITA *  BITB * /BITC * /BITD
STATE14.OUTF     = GO -> /BITA *  BITB * /BITC * /BITD
STATE15.OUTF     = GO -> /BITA *  BITB * /BITC * /BITD
STATE16.OUTF     = GO -> /BITA *  BITB * /BITC * /BITD
STATE17.OUTF     = GO -> /BITA *  BITB * /BITC * /BITD
;
STATE18.OUTF     = GO ->  BITA *  BITB * /BITC * /BITD
STATE19.OUTF     = GO ->  BITA *  BITB * /BITC * /BITD
STATE20.OUTF     = GO ->  BITA *  BITB * /BITC * /BITD
STATE21.OUTF     = GO ->  BITA *  BITB * /BITC * /BITD
STATE22.OUTF     = GO ->  BITA *  BITB * /BITC * /BITD
STATE23.OUTF     = GO ->  BITA *  BITB * /BITC * /BITD
;
STATE24.OUTF     = GO -> /BITA * /BITB *  BITC * /BITD
STATE25.OUTF     = GO -> /BITA * /BITB *  BITC * /BITD
STATE26.OUTF     = GO -> /BITA * /BITB *  BITC * /BITD
STATE27.OUTF     = GO -> /BITA * /BITB *  BITC * /BITD
STATE28.OUTF     = GO -> /BITA * /BITB *  BITC * /BITD
STATE29.OUTF     = GO -> /BITA * /BITB *  BITC * /BITD
;
STATE30.OUTF     = GO ->  BITA * /BITB *  BITC * /BITD
STATE31.OUTF     = GO ->  BITA * /BITB *  BITC * /BITD
STATE32.OUTF     = GO ->  BITA * /BITB *  BITC * /BITD
STATE33.OUTF     = GO ->  BITA * /BITB *  BITC * /BITD
STATE34.OUTF     = GO ->  BITA * /BITB *  BITC * /BITD
STATE35.OUTF     = GO ->  BITA * /BITB *  BITC * /BITD
;
STATE36.OUTF     = GO -> /BITA *  BITB *  BITC * /BITD
STATE37.OUTF     = GO -> /BITA *  BITB *  BITC * /BITD
STATE38.OUTF     = GO -> /BITA *  BITB *  BITC * /BITD
STATE39.OUTF     = GO -> /BITA *  BITB *  BITC * /BITD
STATE40.OUTF     = GO -> /BITA *  BITB *  BITC * /BITD
STATE41.OUTF     = GO -> /BITA *  BITB *  BITC * /BITD
;
STATE42.OUTF     = GO ->  BITA *  BITB *  BITC * /BITD
STATE43.OUTF     = GO ->  BITA *  BITB *  BITC * /BITD
STATE44.OUTF     = GO ->  BITA *  BITB *  BITC * /BITD
STATE45.OUTF     = GO ->  BITA *  BITB *  BITC * /BITD
STATE46.OUTF     = GO ->  BITA *  BITB *  BITC * /BITD
STATE47.OUTF     = GO ->  BITA *  BITB *  BITC * /BITD
;
STATE48.OUTF     = GO -> /BITA * /BITB * /BITC *  BITD
STATE49.OUTF     = GO -> /BITA * /BITB * /BITC *  BITD
STATE50.OUTF     = GO -> /BITA * /BITB * /BITC *  BITD
```

```
          STATE51.OUTF      = GO -> /BITA * /BITB * /BITC *  BITD
          STATE52.OUTF      = GO -> /BITA * /BITB * /BITC *  BITD
          STATE53.OUTF      = GO -> /BITA * /BITB * /BITC *  BITD
          ;
   5      STATE54.OUTF      = GO ->  BITA * /BITB * /BITC *  BITD
          STATE55.OUTF      = GO ->  BITA * /BITB * /BITC *  BITD
          STATE56.OUTF      = GO ->  BITA * /BITB * /BITC *  BITD
          STATE57.OUTF      = GO ->  BITA * /BITB * /BITC *  BITD
          STATE58.OUTF      = GO ->  BITA * /BITB * /BITC *  BITD
  10      STATE59.OUTF      = GO ->  BITA * /BITB * /BITC *  BITD
          ;
          STATE60.OUTF      = GO -> /BITA * /BITB * /BITC * /BITD
          STATE61.OUTF      = GO -> /BITA * /BITB * /BITC * /BITD
          STATE62.OUTF      = GO -> /BITA * /BITB * /BITC * /BITD
  15      STATE63.OUTF      = GO -> /BITA * /BITB * /BITC * /BITD
          ;
          ;TRANSITION EQUATIONS----------------------------------------------------------
          ;
          STATE0      :=    GO    -> STATE1
  20      STATE1      :=    GO    -> STATE2
          STATE2      :=    GO    -> STATE3
          STATE3      :=    GO    -> STATE4
          STATE4      :=    GO    -> STATE5
          STATE5      :=    GO    -> STATE6
  25      STATE6      :=    GO    -> STATE7
          STATE7      :=    GO    -> STATE8
          STATE8      :=    GO    -> STATE9
          STATE9      :=    GO    -> STATE10
          STATE10     :=    GO    -> STATE11
  30      STATE11     :=    GO    -> STATE12
          STATE12     :=    GO    -> STATE13
          STATE13     :=    GO    -> STATE14
          STATE14     :=    GO    -> STATE15
          STATE15     :=    GO    -> STATE16
  35      STATE16     :=    GO    -> STATE17
          STATE17     :=    GO    -> STATE18
          STATE18     :=    GO    -> STATE19
          STATE19     :=    GO    -> STATE20
          STATE20     :=    GO    -> STATE21
  40      STATE21     :=    GO    -> STATE22
          STATE22     :=    GO    -> STATE23
          STATE23     :=    GO    -> STATE24
          STATE24     :=    GO    -> STATE25
          STATE25     :=    GO    -> STATE26
  45      STATE26     :=    GO    -> STATE27
          STATE27     :=    GO    -> STATE28
          STATE28     :=    GO    -> STATE29
          STATE29     :=    GO    -> STATE30
          STATE30     :=    GO    -> STATE31
  50      STATE31     :=    GO    -> STATE32
          STATE32     :=    GO    -> STATE33
          STATE33     :=    GO    -> STATE34
          STATE34     :=    GO    -> STATE35
          STATE35     :=    GO    -> STATE36
```

- 33 -

- 34 -

```
        STATE36    :=    GO    -> STATE37
        STATE37    :=    GO    -> STATE38
        STATE38    :=    GO    -> STATE39
        STATE39    :=    GO    -> STATE40
 5      STATE40    :=    GO    -> STATE41
        STATE41    :=    GO    -> STATE42
        STATE42    :=    GO    -> STATE43
        STATE43    :=    GO    -> STATE44
        STATE44    :=    GO    -> STATE45
10      STATE45    :=    GO    -> STATE46
        STATE46    :=    GO    -> STATE47
        STATE47    :=    GO    -> STATE48
        STATE48    :=    GO    -> STATE49
        STATE49    :=    GO    -> STATE50
15      STATE50    :=    GO    -> STATE51
        STATE51    :=    GO    -> STATE52
        STATE52    :=    GO    -> STATE53
        STATE53    :=    GO    -> STATE54
        STATE54    :=    GO    -> STATE55
20      STATE55    :=    GO    -> STATE56
        STATE56    :=    GO    -> STATE57
        STATE57    :=    GO    -> STATE58
        STATE58    :=    GO    -> STATE59
        STATE59    :=    GO    -> STATE60
25      STATE60    :=    GO    -> STATE61
        STATE61    :=    GO    -> STATE62
        STATE62    :=    GO    -> STATE63
        STATE63    :=    GO    -> STATE0
        ;
30      CONDITIONS
        ;
        GO    =    CLOCK
        ;
        ;--------------------------------Simulation Segment----------------------------------------------
35      SIMULATION
        TRACE_ON
                   BIT1 BIT2 BIT3 BIT4 BIT5 BIT6
                   BITA BITB BITC BITD CLOCK
        CLOCKF
40      CLOCKF
        CLOCKF
        CLOCKF
        CLOCKF
        CLOCKF
45      CLOCKF
        CLOCKF
        CLOCKF
        CLOCKF
        CLOCKF
50      CLOCKF
        CLOCKF
        CLOCKF
        CLOCKF
        CLOCKF
```

- 35 -

```
     CLOCKF
     CLOCKF
     CLOCKF
     CLOCKF
  5  CLOCKF
     CLOCKF
     CLOCKF
     CLOCKF
     CLOCKF
 10  CLOCKF
     CLOCKF
     CLOCKF
     CLOCKF
     CLOCKF
 15  CLOCKF
     CLOCKF
     CLOCKF
     CLOCKF
     CLOCKF
 20  CLOCKF
     CLOCKF
     CLOCKF
     CLOCKF
     CLOCKF
 25  CLOCKF
     CLOCKF
     CLOCKF
     CLOCKF
     CLOCKF
 30  CLOCKF
     CLOCKF
     CLOCKF
     CLOCKF
     CLOCKF
 35  CLOCKF
     CLOCKF
     CLOCKF
     CLOCKF
     CLOCKF
 40  CLOCKF
     CLOCKF
     CLOCKF
     CLOCKF
     CLOCKF
 45  CLOCKF
     CLOCKF
     CLOCKF
     CLOCKF
     CLOCKF
 50  CLOCKF
     CLOCKF
     CLOCKF
     CLOCKF
     CLOCKF
```

- 36 -

```
     CLOCKF
     CLOCKF
     CLOCKF
     CLOCKF
  5  CLOCKF
     CLOCKF
     CLOCKF
     CLOCKF
     CLOCKF
 10  CLOCKF
     CLOCKF
     CLOCKF
     CLOCKF
     CLOCKF
 15  CLOCKF
     CLOCKF
     CLOCKF
     CLOCKF
     CLOCKF
 20  CLOCKF
     CLOCKF
     CLOCKF
     CLOCKF
     CLOCKF
 25  CLOCKF
     CLOCKF
     CLOCKF
     CLOCKF
     CLOCKF
 30  CLOCKF
     CLOCKF
     CLOCKF
     CLOCKF
     CLOCKF
 35  CLOCKF
     CLOCKF
     CLOCKF
     CLOCKF
     CLOCKF
 40  CLOCKF
     CLOCKF
     CLOCKF
     CLOCKF
     CLOCKF
 45  CLOCKF
     CLOCKF
     CLOCKF
     CLOCKF
     CLOCKF
 50  CLOCKF
     CLOCKF
     CLOCKF
     CLOCKF
     CLOCKF
```

```
         CLOCKF
         CLOCKF
         CLOCKF
         CLOCKF
    5    TRACE_OFF
         ;PALASM Design Description
         ;--------------------------------Declaration Segment-----------------------------------------
         TITLE           TransFax U11 chip
         PATTERN         A
   10    REVISION        1.1

;
         CHIP    U11     PAL22V10
         ;
         STRING          NOT0    '/S1 * CE * DEBOUNCE + /S2 * CE * DEBOUNCE + /S3 * CE
   15    ;
         STRING          NOT1    '/CE'
         ;
         STRING          NOT2    'S1 * S2 * S3 * S4 *S5'
         ;
   20    STRING          NOT3    'DEBOUNCE'
         ;
         ;--------------------------------PIN Declarations-----------------------------------------
         PIN 1           CLK             COMBINATORIAL           ; INPUT
         PIN 2           D4              COMBINATORIAL           ; INPUT
   25    PIN 3           D3              COMBINATORIAL           ; INPUT
         PIN 4           D2              COMBINATORIAL           ; INPUT
         PIN 5           D1              COMBINATORIAL           ; INPUT
         PIN 6           S1              COMBINATORIAL           ; INPUT
         PIN 7           S2              COMBINATORIAL           ; INPUT
   30    PIN 8           S3              COMBINATORIAL           ; INPUT
         PIN 9           S4              COMBINATORIAL           ; INPUT
         PIN 10          S5              COMBINATORIAL           ; INPUT
         PIN 11          CE              COMBINATORIAL           ; INPUT
         PIN 12          GND
   35    PIN 13          MS              COMBINATORIAL           ; INPUT
         PIN 14          INTRQ           REGISTERED              ; IO
         PIN 15          DEBOUNCE        COMBINATORIAL           ; INPUT
         PIN 16          TIMER           REGISTERED              ; IO
         PIN 17          OSC             COMBINATORIAL           ; OUTPUT
   40    PIN 18          BITA            REGISTERED              ; IO
         PIN 19          BITB            REGISTERED              ; IO
         PIN 20          BUS4            COMBINATORIAL           ; OUTPUT
         PIN 21          BUS5            COMBINATORIAL           ; OUTPUT
         PIN 22          BUS6            COMBINATORIAL           ; OUTPUT
   45    PIN 23          BUS7            COMBINATORIAL           ; OUTPUT
         PIN 24          VCC
         ;
         ;--------------------------------Boolean Equation Segment-----------------------------------------
         EQUATIONS
   50    ;
         /OSC            =       CLK * S1 * S2 * S3 * S4 * S5 * DEBOUNCE
         ;
         BUS4.TRST       =       /CE
```

- 38 -

```
;
BUS5.TRST    =    /CE
;
BUS6.TRST    =    /CE
;
BUS7.TRST    =    /CE
;
BUS4         =    D1 * /MS
                  + /S1 * S2 * S3 * S4 * S5 * MS
                  + S1 * S2 * /S3 * S4 * S5 * MS
                  + S1 * S2 * S3 * S4 * /S5 * MS
;
BUS5         =    D2 * /MS
                  + S1 * /S2 * S3 * S4 * S5 * MS
                  + S1 * S2 * /S3 * S4 * S5 * MS
;
BUS6         =    D3 * /MS
                  + S1 * S2 * S3 * /S4 * S5 * MS
                  + S1 * S2 * S3 * S4 * /S5 * MS
;
BUS7         =    D4 * /MS
;
;---------------------------State Segment---------------------------
STATE
MEALY_MACHINE
START_UP := POWER_UP     -> STATE0
START_UP.OUTF := VCC     -> INTRQ * TIMER
;
STATE0       =    /BITA * /BITB
STATE1       =    BITA * /BITB
STATE2       =    /BITA * BITB
STATE3       =    BITA * BITB
;
;---------------------------Transition Equations---------------------------
STATE0       := GO1      ->    STATE1
             +->              STATE0
;
STATE1       := GO2      ->    STATE2
             +->              STATE1
;
STATE2       := GO3      ->    STATE3
             +->              STATE2
;
STATE3       := GO0      ->    STATE0
             +->              STATE3
;
;OUTPUT EQUATIONS---------------------------------------------------
;
STATE0.OUTF := GO1       ->    /INTRQ * /TIMER
             +->              INTRQ * TIMER
;
STATE1.OUTF := GO2       ->    INTRQ * /TIMER
             +->              /INTRQ * /TIMER
;
```

```
                                        - 39 -

STATE2.OUTF := GO3         ->       INTRQ * TIMER
                    +->                   INTRQ * /TIMER
      ;
      STATE3.OUTF := GO0         ->       INTRQ * TIMER
 5                 +->                    INTRQ * TIMER
      ;
      CONDITIONS
      GO0          =    NOT3
      GO1          =    NOT0
10    GO2          =    NOT1
      GO3          =    NOT2
      ;----------------------------------Simulation Segment----------------------------------------------
      SIMULATION
      TRACE_ON
15                      BUS4 BUS5 BUS6 BUS7 S1 S2 S3 S4 S5
                        D1 D2 D3 D4 INTRQ CLK OSC DEBOUNCE
                        BITA BITB
      ;
      ;
20    SETF              CE DEBOUNCE MS
      SETF              /D1 /D2 /D3 /D4 S1 S2 S3 S4 S5
      FOR X :=   0 TO 9 DO
                 BEGIN
                 ;
25               ;
                 CLOCKF     CLK
                 CLOCKF     CLK
                 CLOCKF     CLK
      ;
30    ;
                          IF X = 0 THEN
                          BEGIN
                          SETF           /D1 /D2 /D3 /D4 S1 S2 S3 S4 /S5
                          END
35                        IF X = 1 THEN
                          BEGIN
                          SETF           D1 /D2 /D3 /D4 S1 S2 S3 S4 /S5
                          END
                          IF X = 2 THEN
40                        BEGIN
                          SETF           /D1 D2 /D3 /D4 S1 S2 S3 S4 /S5
                          END
                          IF X = 3 THEN
                          BEGIN
45                        SETF           D1 D2 /D3 /D4 S1 S2 S3 S4 /S5
                          END
                          IF X = 4 THEN
                          BEGIN
                          SETF           /D1 /D2 D3 /D4 S1 S2 S3 S4 /S5
50                        END
                          IF X = 5 THEN
                          BEGIN
                          SETF           D1 /D2 D3 /D4 S1 S2 S3 S4 /S5
                          END
```

- 40 -

```
                    IF X = 6 THEN
                    BEGIN
                    SETF            /D1 D2 D3 /D4 S1 S2 S3 S4 /S5
                    END
 5                  IF X = 7 THEN
                    BEGIN
                    SETF            D1 D2 D3 /D4 S1 S2 S3 S4 /S5
                    END
                    IF X = 8 THEN
10                  BEGIN
                    SETF            /D1 /D2 /D3 D4 S1 S2 S3 S4 /S5
                    END
                    IF X = 9 THEN
                    BEGIN
15                  SETF            D1 /D2 /D3 D4 S1 S2 S3 S4 /S5
                    END
     ;
     ;
            CLOCKF  CLK
20          CLOCKF  CLK
            CLOCKF  CLK
            CLOCKF  CLK
            CLOCKF  CLK
            SETF    /CE
25          CLOCKF  CLK
            CLOCKF  CLK
            SETF    CE
            CLOCKF  CLK
            CLOCKF  CLK
30          SETF    /DEBOUNCE
            CLOCKF  CLK
            CLOCKF  CLK
            SETF    /MS /CE
            CLOCKF  CLK
35          CLOCKF  CLK
            SETF    MS CE
            CLOCKF  CLK
            CLOCKF  CLK
            SETF    S1 S2 S3 S4 S5
40          CLOCKF  CLK
            CLOCKF  CLK
            CLOCKF  CLK
            SETF    DEBOUNCE
            CLOCKF  CLK
45          CLOCKF  CLK
            CLOCKF  CLK
            CLOCKF  CLK
            CLOCKF  CLK
     ;
50          END
     ;
     TRACE_OFF
     ;
     ;PALASM Design Description
```

```
;--------------------------Declaration Segment----------------------------------
       TITLE       TransFax U13 chip
       PATTERN     A
       REVISION    1.1

5     CHIP   U13  PAL22V10

;-----------------------------PIN Declarations--------------------------------
       PIN 1       B4                              COMBINATORIAL ; INPUT
       PIN 2       B3                              COMBINATORIAL ; INPUT
       PIN 3       B2                              COMBINATORIAL ; INPUT
10     PIN 4       B1                              COMBINATORIAL ; INPUT
       PIN 5       IS1                             COMBINATORIAL ; INPUT
       PIN 6       IS2                             COMBINATORIAL ; INPUT
       PIN 7       IS3                             COMBINATORIAL ; INPUT
       PIN 9       A1                              COMBINATORIAL ; INPUT
15     PIN 10      A2                              COMBINATORIAL ; INPUT
       PIN 11      A3                              COMBINATORIAL ; INPUT
       PIN 13      A4                              COMBINATORIAL ; INPUT
       PIN 14      C1                              COMBINATORIAL ; IO
       PIN 15      S3                              COMBINATORIAL ; OUTPUT
20     PIN 16      C2                              COMBINATORIAL ; IO
       PIN 17      S4                              COMBINATORIAL ; OUTPUT
       PIN 18      C3                              COMBINATORIAL ; IO
       PIN 19      S2                              COMBINATORIAL ; OUTPUT
       PIN 20      C4                              COMBINATORIAL ; IO
25     PIN 21      S0                              COMBINATORIAL ; OUTPUT
       PIN 23      S1                              COMBINATORIAL ; OUTPUT
       ;--------------------------------Boolean Equation Segment----------------------
       EQUATIONS
       ;
30     C1       =      A1 * B1 + /A1 * /B1
       C2       =      A2 * B2 + /A2 * /B2
       C3       =      A3 * B3 + /A3 * /B3
       C4       =      A4 * B4 + /A4 * /B4
       ;
35     /S0      =      C1 * C2 * C3 * C4 * /IS1 * /IS2 * /IS3
       /S1      =      C1 * C2 * C3 * C4 * /IS1 *  IS2 * /IS3
       /S2      =      C1 * C2 * C3 * C4 *  IS1 *  IS2 * /IS3
       /S3      =      C1 * C2 * C3 * C4 * /IS1 * /IS2 *  IS3
       /S4      =      C1 * C2 * C3 * C4 *  IS1 * /IS2 *  IS3
40     ;
       ;-------------------------------Simulation Segment-----------------------------
       SIMULATION
       TRACE_ON
                   A1 A2 A3 A4 B1 B2 B3 B4 IS1 IS2 IS3
45                 A1 A2 A3 A4 B1 B2 B3 B4 IS1 IS2 IS3
                   S0 S1 S2 S3 S4
       ;
       SETF        /IS1 /IS2 /IS3
       SETF        /A1 /A2 /A3 /A4 /B1 /B2 /B3 /B4 /IS1 /IS2 /IS3
50     ;
       SETF        /IS1 /IS2 /IS3
       SETF         A1 /A2 /A3 /A4  B1 /B2 /B3 /B4 /IS1 /IS2 /IS3
```

- 42 -

```
        ;
        SETF        /IS1 /IS2 /IS3
        SETF        /A1 /A2 /A3 /A4 /B1  B2 /B3 /B4 /IS1 /IS2 /IS3
        ;
 5      SETF        /IS1 /IS2 /IS3
        SETF         A1  A2 /A3 /A4  B1  B2 /B3 /B4 /IS1 /IS2 /IS3
        ;
        SETF        /IS1 /IS2 /IS3
        SETF        /A1 /A2  A3 /A4 /B1 /B2  B3 /B4 /IS1 /IS2 /IS3
10      ;
        SETF        /IS1 /IS2 /IS3
        SETF         A1 /A2  A3 /A4  B1 /B2  B3 /B4 /IS1 /IS2 /IS3
        ;
        SETF        /IS1 /IS2 /IS3
15      SETF        /A1  A2  A3 /A4 /B1  B2  B3 /B4 /IS1 /IS2 /IS3
        ;
        SETF        /IS1 /IS2 /IS3
        SETF         A1  A2  A3 /A4  B1  B2  B3 /B4 /IS1 /IS2 /IS3
        ;
20      SETF        /IS1 /IS2 /IS3
        SETF        /A1 /A2 /A3  A4 /B1 /B2 /B3  B4 /IS1 /IS2 /IS3
        ;
        SETF        /IS1 /IS2 /IS3
        SETF         A1 /A2 /A3  A4  B1 /B2 /B3  B4 /IS1 /IS2 /IS3
25      ;SETF       /IS1 /IS2 /IS3
        SETF        /A1 /A2 /A3  A4  B1 /B2 /B3 /B4  IS1 /IS2 /IS3
        ;
        SETF        /IS1 /IS2 /IS3
        SETF        /A1 /A2 /A3 /A4 /B1  B2 /B3 /B4  IS1 /IS2 /IS3
30      ;
        SETF        /IS1 /IS2 /IS3
        SETF        /A1 /A2 /A3 /A4 /B1 /B2  B3 /B4  IS1 /IS2 /IS3
        ;
        SETF        /IS1 /IS2 /IS3
35      SETF        /A1 /A2 /A3 /A4 /B1 /B2 /B3  B4  IS1 /IS2 /IS3
        ;
        ;
        SETF        /IS1 /IS2 /IS3
        SETF         A1 /A2 /A3 /A4  B1 /B2 /B3 /B4  IS1 /IS2 /IS3
40      ;
        SETF        /IS1 /IS2 /IS3
        SETF        /A1 /A2 /A3 /A4 /B1 /B2 /B3 /B4  IS1 /IS2 /IS3
        ;
        SETF        /IS1 /IS2 /IS3
45      SETF        /A1  A2 /A3 /A4 /B1  B2 /B3 /B4  IS1 /IS2 /IS3
        ;
        SETF        /IS1 /IS2 /IS3
        SETF         A1  A2 /A3 /A4  B1  B2 /B3 /B4  IS1 /IS2 /IS3
        ;
50      SETF        /IS1 /IS2 /IS3
        SETF        /A1 /A2  A3 /A4 /B1 /B2  B3 /B4  IS1 /IS2 /IS3
        ;
        SETF        /IS1 /IS2 /IS3
```

- 43 -

```
     SETF     A1 /A2  A3 /A4  B1 /B2  B3 /B4  IS1 /IS2 /IS3
     ;
     SETF     /IS1 /IS2 /IS3
     SETF     /A1  A2  A3 /A4 /B1  B2  B3 /B4  IS1 /IS2 /IS3
 5   ;
     SETF     /IS1 /IS2 /IS3
     SETF      A1  A2  A3 /A4  B1  B2  B3 /B4  IS1 /IS2 /IS3
     ;
     SETF     /IS1 /IS2 /IS3
10   SETF     /A1 /A2 /A3  A4 /B1 /B2 /B3  B4  IS1 /IS2 /IS3
     ;
     SETF     /IS1 /IS2 /IS3
     SETF      A1 /A2 /A3  A4  B1 /B2 /B3  B4  IS1 /IS2 /IS3
     ;
15   ;
     SETF     /IS1 /IS2 /IS3
     SETF     /A1 /A2 /A3 /A4 /B1 /B2 /B3 /B4 /IS1  IS2 /IS3
     ;
     SETF     /IS1 /IS2 /IS3
20   SETF      A1 /A2 /A3 /A4  B1 /B2 /B3 /B4 /IS1  IS2 /IS3
     ;
     SETF     /IS1 /IS2 /IS3
     SETF     /A1  A2 /A3 /A4 /B1  B2 /B3 /B4 /IS1  IS2 /IS3
     ;
25   SETF     /IS1 /IS2 /IS3
     SETF      A1  A2 /A3 /A4  B1  B2 /B3 /B4 /IS1  IS2 /IS3
     ;
     SETF     /IS1 /IS2 /IS3
     SETF     /A1 /A2  A3 /A4 /B1 /B2  B3 /B4 /IS1  IS2 /IS3
30   ;
     SETF     /IS1 /IS2 /IS3
     SETF      A1 /A2  A3 /A4  B1 /B2  B3 /B4 /IS1  IS2 /IS3
     ;
     SETF     /IS1 /IS2 /IS3
35   SETF     /A1  A2  A3 /A4 /B1  B2  B3 /B4 /IS1  IS2 /IS3
     ;
     SETF     /IS1 /IS2 /IS3
     SETF      A1  A2  A3 /A4  B1  B2  B3 /B4 /IS1  IS2 /IS3
     ;
40   SETF     /IS1 /IS2 /IS3
     SETF     /A1 /A2 /A3  A4 /B1 /B2 /B3  B4 /IS1  IS2 /IS3
     ;
     SETF     /IS1 /IS2 /IS3
     SETF      A1 /A2 /A3  A4  B1 /B2 /B3  B4 /IS1  IS2 /IS3
45   ;
     ;
     SETF     /IS1 /IS2 /IS3
     SETF     /A1 /A2 /A3 /A4 /B1 /B2 /B3 /B4  IS1  IS2 /IS3
     ;
50   SETF     /IS1 /IS2 /IS3
     SETF      A1 /A2 /A3 /A4  B1 /B2 /B3 /B4  IS1  IS2 /IS3
     ;
     SETF     /IS1 /IS2 /IS3
     SETF     /A1  A2 /A3 /A4 /B1  B2 /B3 /B4  IS1  IS2 /IS3
```

```
        ;
        SETF       /IS1 /IS2 /IS3
        SETF       A1  A2 /A3 /A4  B1  B2 /B3 /B4  IS1  IS2 /IS3
        ;
  5     SETF       /IS1 /IS2 /IS3
        SETF       /A1 /A2  A3  A4 /B1 /B2  B3  B4  IS1  IS2 /IS3
        ;
        SETF       /IS1 /IS2 /IS3
        SETF       A1 /A2  A3  A4  B1 /B2  B3  B4  IS1  IS2 /IS3
 10     ;
        SETF       /IS1 /IS2 /IS3
        SETF       /A1  A2  A3  A4 /B1  B2  B3  B4  IS1  IS2 /IS3
        ;
        SETF       /IS1 /IS2 /IS3
 15     SETF       A1  A2  A3 /A4  B1  B2  B3 /B4  IS1  IS2 /IS3
        ;
        SETF       /IS1 /IS2 /IS3
        SETF       /A1 /A2 /A3  A4 /B1 /B2 /B3  B4  IS1  IS2 /IS3
        ;
 20     SETF       /IS1 /IS2 /IS3
        SETF       A1 /A2 /A3  A4  B1 /B2 /B3  B4  IS1  IS2 /IS3
        ;
        ;
        SETF       /IS1 /IS2 /IS3
 25     SETF       /A1 /A2 /A3 /A4 /B1 /B2 /B3 /B4 /IS1 /IS2  IS3
        ;
        SETF       /IS1 /IS2 /IS3
        SETF       A1 /A2 /A3 /A4  B1 /B2 /B3 /B4 /IS1 /IS2  IS3
        ;
 30     SETF       /IS1 /IS2 /IS3
        SETF       /A1  A2 /A3 /A4 /B1  B2 /B3 /B4 /IS1 /IS2  IS3
        ;
        SETF       /IS1 /IS2 /IS3
        SETF       A1  A2 /A3 /A4  B1  B2 /B3 /B4 /IS1 /IS2  IS3
 35     ;
        SETF       /IS1 /IS2 /IS3
        SETF       /A1 /A2  A3 /A4 /B1 /B2  B3 /B4 /IS1 /IS2  IS3
        ;
        SETF       /IS1 /IS2 /IS3
 40     SETF       A1 /A2  A3 /A4  B1 /B2  B3 /B4 /IS1 /IS2  IS3
        ;
```

What is claimed is:

1. Apparatus for translating a facsimile signal representative of a source natural language to a target natural language text comprising:

means for receiving a facsimile signal representative of a source natural language;

an optical character recognizer and software module means for converting the facsimile signal into text signal representative of the source natural language;

natural language recognition means including an etymololgizer software module for performing text matches with several natural languages and selecting the matched natural language as the source naural language;

means for enabling translation into the target natural language;

natural language translation means enable by the enabling means for generating a target natural language translation signal from the text signal; and output means for outputting the target natural language translation signal in a visually perceivable form.

2. Apparatus for translating a facsimile signal representative of a source natural language to a target natural language according to claim 1 wherein the output means further comprises means for converting the target natural language translation to an outbound facsimile signal containing images of the translated text in the target natural language and means for transmitting the outbound facsimile signal to a remote facsimile machine.

3. Apparatus for translating a facsimile signal representative of a source natural language to a target natural language according to claim 1 wherein the output means further comprises means for converting the target natural language translation to a modem signal representative of the translated text in the target natural language and means for transmitting the modem signal to a remote modem.

4. Apparatus for translating a facsimile signal representative of a source natural language to a target natural language according to claim 1 wherein the natural language translation means further comprises:

a dictionary database of words and compound expressions in the source natural language whose meanings are defined in the target natural language;

means for recognizing and storing a list of undefined source natural language words not defined in the dictionary database;

means for selecting and syntactically ordering target natural language words from the dictionary data base to form target natural language translated text which represents the meaning of the source natural language text;

means for transmitting said list of undefined source natural language words to a remote site; and means for receiving an update transmission that updates the dictionary database with definitions for the previously undefined source natural language words.

5. Apparatus for translating a facsimile signal representative of a source natural language to a target natural language according to claim 1 further comprising means for modifying the configuration of said language translation to means via a transmission from the remote location.

6. Apparatus for translating a facsimile signal representative of a source natural language to a target natural language according to claim 1 further comprising means for requesting a remote facsimile machine to send incoming facsimile signals containing text images in a high resolution mode.

7. Apparatus for translating a facsimile signal representative of a source natural language to a target natural language according to claim 1 further comprising translation accuracy check means for translating the target natural language text back into the source natural language.

8. A method of translating a facsimile signal representative of a source natural language text to a target natural language comprising the steps of:

receiving a facsimile signal containing text images in a source natural language;

converting the facsimile signal with an optical character recognizer and software module into a text signal representative of the source natural language;

sending the text signal to an etymologizer software module for performing text matches with several natural languages and selecting the matched natural language the source natural language directly and exclusively from the text signal itself;

enabling translation into the matched natural language;

generating a target natural language translation signal of the text signal from the recognized source natural language; and outputting the target natural language translation signal in a visually perceivable form.

9. A method of translating a facsimile signal representative of a source natural language text to a target natural language according to claim 8 further comprising the steps of scanning hard copy text images in a source natural language and converting the scanned hard copy text images into text in the source natural language.

10. A method of translating a facsimile signal representative of a source natural language text to a target natural language according to claim 8 wherein the output step is comprised of the steps of converting the target natural language translation to a facsimile signal containing images of the translated text in the target natural language and transmitting the facsimile signal to a remote facsimile machine.

11. A method of translating a facsimile signal representative of a source natural language text to a target natural language according to claim 8 wherein the output step is comprised of the steps of converting the target natural language translation to a modem signal representative of the translated text in the target natural language and transmitting the modem signal to a remote modem.

12. A method of translating a facsimile signal representative of a source natural language text to a target natural language according to claim 8 wherein the step of generating a target natural language translation comprises the steps of:

accessing a dictionary database of words and compound expressions in the source natural language whose meanings are defined in the target natural language;

recognizing and storing a list of undefined source natural language words not defined in the dictionary database;

selecting and syntactically ordering target natural language words from the dictionary database to form target natural language translated text which represents the meaning of the source natural language text;

transmitting the list of undefined source natural language words to a remote site; and receiving an update transmission that updates the dictionary database with definitions for the previously undefined source natural language words.

13. A method of translating a facsimile signal representative of a source natural language text to a target natural language according to claim 8 further comprising the step of modifying the configuration of the language translation step via a transmission from a remote location.

14. A method of translating a facsimile signal representative of a source natural language text to a target natural language according to claim 8 further comprising the step of requesting a remote facsimile machine to send incoming facsimile signals containing text images in a high resolution mode.

15. A method of translating a facsimile signal representative of a source natural language text to a target natural language according to claim 11 further comprising the step of translating the target natural language translated text back into the source natural language for the purpose of checking the accuracy of a translation.

\* \* \* \* \*